United States Patent
Bedi et al.

(10) Patent No.: US 12,462,434 B2
(45) Date of Patent: Nov. 4, 2025

(54) AUTONOMOUS AESTHETICS-AWARE DETECTION OF COUNTERFEIT PRODUCTS

(71) Applicant: Adobe Inc., San Jose, CA (US)

(72) Inventors: Ajay Bedi, Hamirpur (IN); Rishu Aggarwal, Rohini (IN)

(73) Assignee: Adobe Inc., San Jose, CA (US)

(*) Notice: Subject to any disclaimer, the term of this patent is extended or adjusted under 35 U.S.C. 154(b) by 621 days.

(21) Appl. No.: 17/518,343

(22) Filed: Nov. 3, 2021

(65) Prior Publication Data
US 2023/0132941 A1   May 4, 2023

(51) Int. Cl.
*G06T 7/90*  (2017.01)
*G06F 21/10*  (2013.01)
*G06N 20/00*  (2019.01)
*G06T 7/12*  (2017.01)

(52) U.S. Cl.
CPC ............ *G06T 7/90* (2017.01); *G06F 21/10* (2013.01); *G06T 7/12* (2017.01); *G06N 20/00* (2019.01); *G06T 2210/12* (2013.01)

(58) Field of Classification Search
None
See application file for complete search history.

(56) References Cited

U.S. PATENT DOCUMENTS

| | | | |
|---|---|---|---|
| 10,997,752 | B1 | 5/2021 | Yoo et al. |
| 2016/0004934 | A1* | 1/2016 | Ebata .................. G06T 7/001 705/317 |
| 2020/0294342 | A1 | 9/2020 | Ronayne, Jr. et al. |
| 2020/0311790 | A1* | 10/2020 | Keren ............... G06Q 20/4016 |

(Continued)

FOREIGN PATENT DOCUMENTS

| | | |
|---|---|---|
| CA | 111291797 A | 6/2020 |
| CN | 109685528 A | 4/2019 |

OTHER PUBLICATIONS

Annasaro, E., and A. Hema. "Color and shape feature extraction and matching in pill identification systems." Int. J. Comput. Sci. Inf. Technol 5.2 (2014): 1011-1015. (Year: 2014).*

(Continued)

*Primary Examiner* — Samah A Beg
(74) *Attorney, Agent, or Firm* — Keller Preece PLLC

(57) ABSTRACT

Methods, systems, and non-transitory computer readable media are disclosed for accurately and efficiently identifying digital images that portray counterfeit products. The disclosed system can store key values and properties of authentic graphic elements (logos, trademarks, designs, etc.,). For example, the disclosed system can determine authentic graphic features comprising authentic shape features, authentic color features, and authentic text features corresponding with a graphic element. The disclosed system can further extract a graphic element from a digital image for comparison with the authentic graphic element. For instance, the disclosed system can extract graphic features of the graphic element, the graphic features comprising shape features, color features, and text features from the graphic element. The disclosed system can further determine whether the digital image portrays a counterfeit or an authentic product based on comparing the authentic graphic features with the extracted graphic features.

20 Claims, 13 Drawing Sheets

(56) References Cited

U.S. PATENT DOCUMENTS

2021/0182873 A1* 6/2021 Lang .................. G06V 10/82

OTHER PUBLICATIONS

Daoud, Eduard, et al. "Enhancing fake product detection using deep learning object detection models." Universitat Chemnitz (2019). (Year: 2019).*

Wang, Zhi, et al. "Fast adaptive threshold for the canny edge detector." MIPPR 2005: Image Analysis Techniques. vol. 6044. SPIE, 2005. (Year: 2005).*

Zhang, Yifei, et al. "Logo detection and recognition based on classification." Web-Age Information Management: 15th International Conference, WAIM 2014, Macau, China, Jun. 16-18, 2014. Proceedings 15. Springer International Publishing, 2014. (Year: 2014).*

Gandhi, Shreyansh, et al. "Scalable detection of offensive and non-compliant content/logo in product images." Proceedings of the IEEE/CVF winter conference on applications of computer vision. 2020. (Year: 2020).*

Romberg, Stefan, et al. "Scalable logo recognition in real-world images." Proceedings of the 1st ACM international conference on multimedia retrieval. 2011. (Year: 2011).*

Rusiñol, Marçal, and Josep Lladós. "Efficient logo retrieval through hashing shape context descriptors." Proceedings of the 9th IAPR International Workshop on Document Analysis Systems. 2010. (Year: 2010).*

Office Action as received in Chinese Application No. 202210963647.9 dated Jun. 27, 2025.

* cited by examiner

Comparing Authentic Text Features With Text Features _712_

Authentic Text Features _732_

Position x_y
Text Style
Text Warp
Top Left Color
Bottom Right Color

Text Features _734_

Position x_y
Text Style
Text Warp
Top Left Color
Bottom Right Color

*Fig. 7B*

AUTONOMOUS AESTHETICS-AWARE DETECTION OF COUNTERFEIT PRODUCTS

BACKGROUND

Recent years have seen significant improvement in hardware and software platforms for buying and selling products by electronic means. For example, developers have created technologies to modify or improve e-commerce platforms to provide information about and sell products. To illustrate, beside presenting product details including price, specifications, offers, and other details, conventional e-commerce systems often present product images to assist buyers. For example, conventional e-commerce systems often upload product images taken and submitted by sellers. Unfortunately, while e-commerce systems have become more popular and allow for expanded reach and greater ease of selling a product, e-commerce systems also have expanded the market for counterfeit products. Indeed, counterfeit products are commonly sold on-line as genuine products. Despite product images, detecting counterfeit products is not a straightforward or easy task.

SUMMARY

One or more embodiments provide benefits and/or solve one or more problems in the art with systems, methods, and non-transitory computer readable storage media that accurately and efficiently identify counterfeit products in digital images based on various features within the digital images. Generally, the disclosed system store key values computed based on the shape and other properties of authentic logos. To illustrate, the disclosed system extract a logo image including an identified logo from a digital image. The disclosed system generate an edge map of the authentic logo in the logo image to define a shape representation of an authentic logo. The disclosed system further register authentic color shades and gradients at each section of the authentic logo. Furthermore, the disclosed system register valid text styles and other properties for text used in the logo image. The disclosed system similarly extract properties from a logo within an uploaded image. The disclosed system then determine whether the uploaded image portrays an authentic or counterfeit product by comparing the features extracted from the authentic logo with features extracted from the logo within the uploaded image.

Additional features and advantages of one or more embodiments of the present disclosure will be set forth in the description which follows, and in. part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

FIGS. 7A-7B illustrate an overview of comparing authentic graphic features with graphic features in accordance with one or more embodiments of the present disclosure.

DETAILED DESCRIPTION

Figure 1:
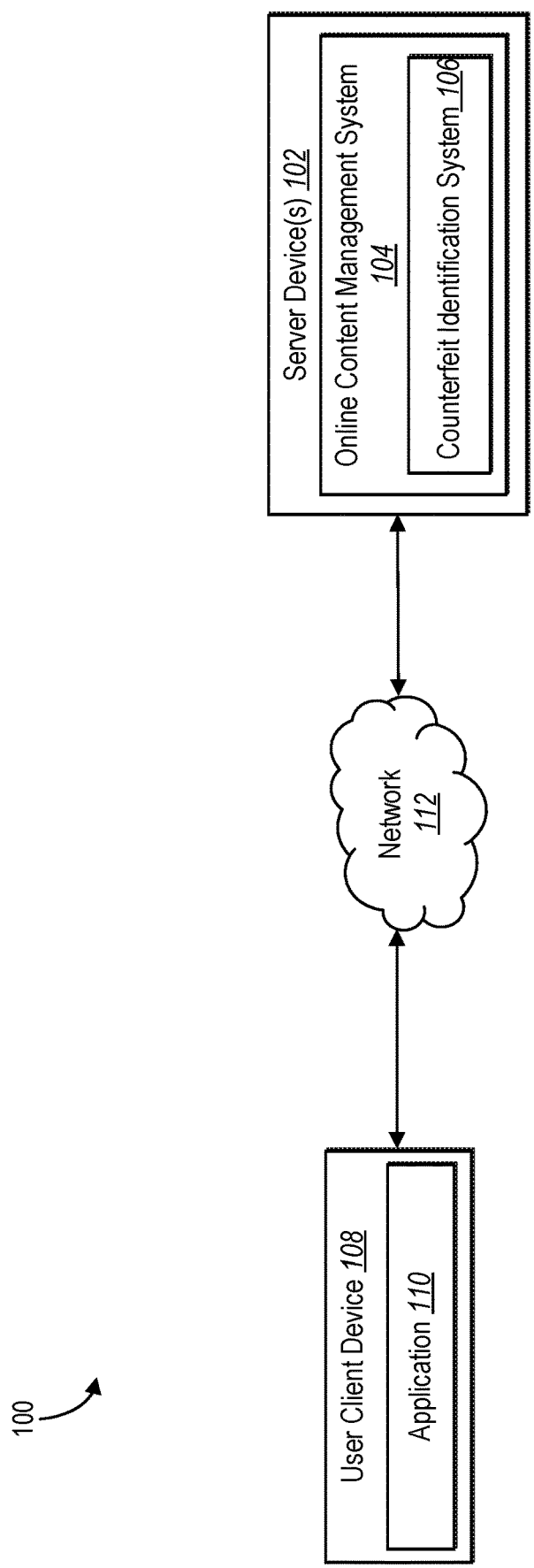
FIG. 1 illustrates an environment in which a counterfeit identification system operates in accordance with one or more embodiments of the present disclosure.

One or more embodiments of the present disclosure includes a counterfeit identification system that automatically determines whether a digital image portrays a counterfeit product by extracting and comparing authentic graphic features with graphic features from the digital image. In particular, the counterfeit identification system localizes an authentic logo image from an authentic digital image. The counterfeit identification system extracts authentic logo features from the authentic logo image. The authentic graphic features reflect properties of the authentic logo image including authentic shape features, authentic color features, and authentic text features. The counterfeit identification system further localizes and extracts a logo image from a digital image portraying a product. The counterfeit identification system further extracts graphic features for the graphic element including shape features, color features, and text features. The counterfeit identification system validates the graphic features by comparing the graphic features with the authentic graphic features.

To illustrate, in some embodiments, the counterfeit identification system extracts an authentic graphic element from an authentic digital image. The counterfeit identification system determines authentic graphic features for the authentic graphic element. For example, the counterfeit identification system determines authentic graphic features comprising one or more of authentic shape features, authentic color features, or authentic text features. In some embodiments, the counterfeit identification system extracts a graphic element from a digital image to be analyzed. The counterfeit identification system further generates graphic features for the graphic element. For example, similar to the authentic graphic features, the counterfeit identification system generates graphic features comprising one or more of shape features, color features, or text features. In some embodiments, the counterfeit identification system determines that the digital image portrays a counterfeit product based on comparing the graphic features and the authentic graphic features.

As just mentioned, in some embodiments, the counterfeit identification system extracts an authentic graphic element, such as a logo, from an authentic digital image portraying an authentic product. Similarly, the counterfeit identification system also extracts a graphic element from a digital image portraying a product to be analyzed. In some embodiments, the counterfeit identification system localizes and extracts the authentic graphic element and the graphic element by utilizing a Convolutional Neural Network trained using various graphic element digital images. In particular, the counterfeit identification system generates bounding boxes including the graphic element boundary, a mask region, and a confidence score indicating a likelihood that the bounding box includes the graphic element.

The counterfeit identification system further determines authentic graphic features for the authentic graphic element. Generally, authentic graphic features comprise key properties of authentic graphic elements. Authentic graphic features include authentic shape features, authentic color features, authentic text features, etc. In one or more implementations, the counterfeit identification system determines authentic shape features by computing an edge map of the authentic graphic element. In some embodiments, the counterfeit identification system generates the authentic color features by mapping pixels from the authentic graphic element into a color space to define an acceptable range of color values. Furthermore, the counterfeit identification system generate authentic text features by determining individual text properties such as position, style, warp, and color.

The counterfeit identification system also generates graphic features for the graphic element. Generally, the counterfeit identification system identifies properties of the graphic element that to compare against the authentic graphic element. In some embodiments, the counterfeit identification system generates graphic features that mirror the authentic graphic features. To illustrate, the counterfeit identification system generates shape features, color features, and text features for the graphic element. The counterfeit identification system, in one or more implementations, uses the same methods and procedures to generate the graphic features as used to generate the authentic graphic features.

The counterfeit identification system further analyzes the graphic features and the authentic graphic features to determine whether a digital image portrays a counterfeit product. In some embodiments, the counterfeit identification system compares the graphic features with the authentic graphic features to determine whether the digital image portrays a counterfeit product. In one example, based on determining that any one of the shape features, color features, or text features fall outside an acceptable threshold range of the authentic graphic features, the counterfeit identification system determines that the digital image portrays a counterfeit product. For example, based on determining that the shape of the graphic element is different than the shape of the authentic graphic element, the counterfeit identification system determines that the digital image portrays a counterfeit product.

In some embodiments, the counterfeit identification system intelligently analyzes the graphic features and the authentic graphic features utilizing a counterfeit detection model. In particular, the counterfeit identification system trains the counterfeit detection model using training images portraying both counterfeit and authentic products. The counterfeit identification system further trains the counterfeit detection model to generate one or more similarity confidence scores indicating a similarity between a graphic element and an authentic graphic element. The counterfeit identification system utilizes the counterfeit detection model to analyze graphic features of graphic elements and generate similarity confidence scores. Based on determining that at least one of the confidence scores corresponding to a digital image falls below a threshold similarity value, the counterfeit identification system determines that the digital image portrays a counterfeit product.

The counterfeit identification system also provides several technical benefits relative to conventional systems. Specifically, conventional e-commerce systems are often inaccurate and inefficient. In particular, a large proportion of products displayed and sold via conventional e-commerce systems are often uploaded by third-party vendors not associated with product manufacturers or the e-commerce system. Some conventional systems attempt to identify and remove counterfeit products; however, most conventional systems fail to do so accurately. To illustrate, some conventional systems utilize template or image matching techniques to label images as fake. Other conventional e-commerce systems analyze text descriptions of the product. However, many counterfeit products often mimic genuine products or corresponding text so closely that conventional systems often mislabel products as fake or genuine.

Due, in part, to shortcomings in accuracy, conventional systems often inefficiently utilize computational, storage, and communication resources. Conventional e-commerce systems expend computing resources to displaying and completing transactions for counterfeit products. Conventional systems often fail to identify products as fake until a purchaser has received and complained about a counterfeit product. Thus, conventional systems often expend additional communication resources receiving notifications of counterfeit products. Yet additional computing power must be utilized to remove counterfeit products.

Even conventional systems that attempt to identify counterfeit products before publishing them often function inefficiently. For instance, and as mentioned, some conventional systems rely on template or image matching to identify counterfeit products. Template matching often requires conventional systems to process large amounts of image data before identifying the target image or template.

The counterfeit identification system improves accuracy relative to conventional systems. The counterfeit identification system determines authentic graphic features that reflect various aesthetics and other visual properties of authentic graphic elements. In comparison with conventional systems that frequently rely on rigid and unrepresentative characteristics, the counterfeit identification system evaluates a wide range of properties of authentic graphic features including authentic shape features, authentic color features, and authentic text features. The counterfeit identification system further compares the authentic graphic features with corresponding graphic features for a graphic element from a digital image to evaluate whether the digital image portrays a counterfeit or genuine product.

The counterfeit identification system also improves efficiency relative to conventional e-commerce systems. The counterfeit identification system efficiently identifies counterfeit digital images portraying counterfeit products based on analyzing digital images. Accordingly, instead of expending computing resources to presenting digital images portraying counterfeit products and identifying counterfeits based on purchaser feedback, the counterfeit identification system automatically flags digital images containing counterfeit products before posting them.

Furthermore, the counterfeit identification system improves efficiency by extracting authentic graphic elements and selectively analyzing the authentic graphic elements. Instead of analyzing entire digital images, the counterfeit identification system, in one or more implementations, utilizes a machine learning model to intelligently identify portions of digital images and authentic digital images that contain an authentic graphic element or a graphic element. The counterfeit identification system further performs an analysis on the identified authentic graphic element or graphic element. Thus, the counterfeit identification system reduces the amount of computing resources required to generate authentic graphic features and graphic features.

As illustrated by the foregoing discussion, the present disclosure utilizes a variety of terms to describe features and advantages of the disclosed method. Additional detail is now provided regarding the meaning of such terms. For example, as used herein, the term "authentic graphic element" refers to a distinctive visual item. In particular, an authentic graphic element is a symbol or other design used by an organization to identify its products. For example, authentic graphic elements include a logo, symbol, design, or trademark specific to a given organization. An authentic graphic element is often affixed to a product portrayed within an authentic digital image.

Relatedly, as used herein, the term "graphic element" refers to a visual item affixed to a product within a digital image. In particular, a graphic elements include a logo, symbol, design, or trademark similar to an authentic graphic element. For example, a graphic element is often affixed to a product portrayed within a digital image. A counterfeit graphic element is intended to mimic an authentic graphic element.

As used herein, the term "authentic digital image" refers to an electronic representation of genuine subject matter, such as by a set of pixels. In particular, the term "authentic digital image" refers to a digital image portraying an authentic product from a given organization. An authentic digital image comprises any suitable format such as bitmap or a JPEG file format. An authentic digital image comprises a product image portraying a branded product originating from the brand's organization. More specifically, an authentic digital image portray an authentic product as identified by an authentic graphic element.

As used herein, the term "digital image" refers to an electronic representation of counterfeit or authentic subject matter. In particular, a digital image can include a digital image portraying a counterfeit product that is similar to an authentic product from the given organization. Alternatively, a digital image can portray an authentic product. For example, a digital image may be uploaded by a user (e.g., a third-party vendor) to an online content management system to represent an item being sold or considered for purchase by the user. Relatedly, the term "counterfeit digital image" refers to a digital image portraying a counterfeit product.

As used herein, the term "authentic graphic features" refers to characteristics or properties of an authentic graphic element. In particular, authentic graphic features include various distinctive features reflecting properties of an authentic graphic element. For example, authentic graphic features include key values computed based on the shape, color, text, or other component of an authentic graphic element.

Relatedly, as used herein, the term "graphic features" refers to characteristics or properties of a graphic element within a digital image. In particular, graphic features include various properties of the graphic element. For example, graphic features include values computed based on the shape, color, text, or other components of a graphic element. In one or more implementations, the graphic features may be similar to, but differ, from the authentic graphic features.

As used here, the term "authentic shape features" refers to properties relating to the shape of an authentic graphic element. In particular, authentic shape features include a shape representation that indicate the locations of edges of an authentic graphic element. For example, in some embodiments, authentic shape features comprise a shape vector/list including points indicating pixel locations of edges of a graphic element. Relatedly, the term "shape features" refer to a shape representation that indicate the locations of edges of a graphic element within a digital image.

As used herein, the term "authentic color features" refers to distinctive color properties of an authentic graphic element. In particular, authentic color features include color values and corresponding pixel locations within an authentic graphic element. The authentic color features comprise color values from a Hue Saturation Value (HSV), Hue Saturation Light (HSL), Red Blue Green (RBG), or other color space for each pixel location within an authentic graphic element. Relatedly, the term "color features" refers to color properties of a graphic element. For example, color features also include color values from an HSV, HSL, RBG, or other color space for each pixel location within a graphic element.

As used herein, the term "authentic text features" refers to distinctive text properties of an authentic graphic element. In particular, authentic text features reflect various text properties of text found within the authentic graphic element. For example, text features indicate the position of the text, text style, text warp, text color, and other properties of text within the authentic graphic element. Relatedly, the term "text features" refers to text properties of text found within a graphic element. Text features include one or more of the position of the text, text style, text warp, text color, or other properties of text within the graphic element.

As used herein, the term "counterfeit product" refers to a fake or unauthorized replica of an authentic product. In particular, a counterfeit product is a good made or sold under a given brand name without the brand owner's authorization. For example, a counterfeit product comprises a good having a graphic element intended to mimic an authentic graphic element.

The following disclosure provides additional detail regarding the counterfeit identification system in relation to illustrative figures portraying example embodiments and implementations of the counterfeit identification system. For example, FIG. 1 illustrates a schematic diagram of a system environment (or "environment") 100 in which a counterfeit identification system 106 operates in accordance with one or more embodiments. As illustrated, the environment 100 includes one or more server device(s) 102, connected to a user client device 108 via a network 112. While FIG. 1 shows an embodiment of the counterfeit identification system 106, alternative embodiments and configurations are possible.

As shown in FIG. 1, the server device(s) 102 and the user client device 108 are connected via the network 112. As shown, in one or more implementations, each of the components of the environment 100 communicate via the network 112. The network 112 comprises a suitable network over which computing devices are able to communicate. Example networks are discussed in additional detail below in relation to FIG. 11.

As shown, the environment 100 includes the server device(s) 102. The server device(s) 102 generates, stores, receives, and/or transmits digital content including digital video, digital images, digital audio, metadata, etc. In particular, in one or more implementations, the server device(s) 102 provides digital content via web pages or native application to devices such as the user client device 108. The server device(s) 102 is able to communicate with the user client device 108 via the network 112. For example, the server device(s) 102 gathers and/or receives digital images including authentic digital images and/or digital images from the user client device 108. The server device(s) 102 may also present digital images and authentic digital images at the user client device 108. In some embodiments, the server device(s) 102 comprise a distributed server where the server device(s) 102 include a number of server devices distributed across the network 112 and located in different physical locations. The server device(s) 102 optionally comprises a content server, an application server, a communication server, a web-hosting server, or a digital content management server.

As further shown in FIG. 1, the server device(s) 102 includes an online content management system 104. In one or more embodiments, the online content management system 104 comprises an e-commerce management system that facilitates the online purchase of products over the network 112. The online content management system 104 also performs various backend functions associated with the online presence of a seller in order to facilitate the online purchase of products. In some embodiments, the online content management system 104 verifies the authenticity of products submitted to the online content management system 104. For example, the online content management system 104 identifies digital images portraying counterfeit products. Furthermore, the online content management system 104 optionally performs other backend functions associated with the online presence of a seller. For example, the online content management system 104 generates web pages or other types of network content that are provided to the user client device 108 for the purpose of selecting items for purchase, rental, download, lease, or other form of consumption as will be described.

As illustrated in FIG. 1, the counterfeit identification system 106 is implemented as part of the online content management system 104. Generally, the counterfeit identification system 106 intelligently identifies digital images portraying counterfeit products by comparing graphic features in the digital image with authentic graphic features. In particular, the counterfeit identification system 106 extracts an authentic graphic element from an authentic digital image and determines authentic graphic features, including authentic shape features, authentic color features, and authentic text features, from the authentic graphic element. The counterfeit identification system 106 further extracts a graphic element from a digital image and generate graphic features for the graphic element. The counterfeit identification system 106 further determines whether the digital image portrays a counterfeit product based on comparing the graphic features and the authentic graphic features.

As illustrated in FIG. 1, the environment 100 includes the user client device 108. The user client device 108 is able to generate, store, receive, and send digital data. For example, the user client device 108 communicates with the server device(s) 102 via the network 112. The user client device 108 illustrated in FIG. 1 may comprise various types of client devices. For example, in some embodiments, the user client device 108 is a mobile device such as a laptop, tablet, mobile telephone, smartphone, etc. In other embodiments, the user client device 108 includes non-mobile devices, such as desktops or servers, or other types of client devices. Additional details regarding the computing devices, of which the user client device 108 is one implementation, are discussed below with respect to FIG. 11.

The user client device 108 is optionally associated with a user or user account of an e-commerce platform managed by the online content management system 104. For instance, the user client device 108 is associated with a consumer of a product. Additionally, the user client device 108 is optionally associated with a user who is browsing and viewing products listed by the online content management system 104. As mentioned, the user client device 108 communicates with the server device(s) 102. In particular, the user client device 108 uploads and sends digital data including digital images (e.g., user-submitted images) to the server device(s) 102 via the network 112. Additionally, the user client device 108 displays graphical user interfaces including product images to a user associated with the user client device 108.

Additionally, or alternatively, the user client device 108 (or another client device) is associated with a seller of a product or a marketer of a product. For example, the user client device 108 sends, to the server device(s) 102 information regarding products for sale by the seller including digital images portraying the product for sale. In some embodiments, the user client device 108 sends, to the server device(s) 102, authentic digital images portraying authentic products. In some examples the user client device 108 is associated authentic vendor or seller. The authentic vendor sends, to the device(s) 102 via the user client device 108, authentic graphic features that the counterfeit identification system 106 uses to evaluate digital images potentially containing counterfeit products.

As illustrated in FIG. 1, the user client device 108 includes the application 110. The application 110 may be a web application or a native application on the user client device 108 (e.g., a mobile application, a desktop application, etc.). The application 110 interfaces with the counterfeit identification system 106 to provide digital content including product information such as digital images to the device(s) 102. In one or more implementations, the application 110 is a browser that renders a graphical user interface on the display of the user client device 108. For example, the application 110 renders a series of graphical user interfaces for uploading product information and managing associations between product information and promotional content. Additionally, the application 110 optionally presents simulations of web pages from a perspective accessing the web page from a customer client device. Simulating the web pages to preview content regarding the product allows a seller to review the product information. Furthermore, in some embodiments, the application 110 renders an indication of whether a product has been flagged as a counterfeit or authentic product.

Although FIG. 1 depicts the counterfeit identification system 106 located on the device(s) 102, in some embodiments, the counterfeit identification system 106 is implemented by (e.g., located entirely or in part) on one or more other components of the environment 100. For example, the counterfeit identification system 106 may be implemented entirely (or in part) on the user client device 108. For example, the device(s) 102 and/or the user client device 108 has digital images or authentic digital images stored thereon.

Although the environment 100 includes a single user client device 108, in one or more embodiments, the environment 100 includes multiple user client devices and client devices. For example, the environment 100 include a first user client device 108 associated with a buyer who views a web page displaying product information for the product. The environment 100 also optionally includes a second user client device 108 associated with a seller or vendor who has uploaded product information including digital images and/or authentic digital images.

Additionally, the user client device 108 optionally communicates directly with the counterfeit identification system 106, bypassing the network 112. Moreover, counterfeit identification system 106 is able to access one or more databases (e.g., a digital image database) housed on the server device(s) 102 or elsewhere in the environment 100. Further, the counterfeit identification system 106 optionally includes one or more machine learning models (e.g., neural networks), and the counterfeit identification system 106 is implemented in a variety of different ways across the server device(s) 102, the network 112, and the user client device 108.

In particular, in some implementations, the counterfeit identification system 106 on the server device(s) 102 supports the application on the user client device 108. For instance, the counterfeit identification system 106 on the server device(s) 102 generates or trains the counterfeit identification system 106. The server device(s) 102 provides the trained counterfeit identification system 106 to the user client device 108. In other words, the user client device 108 obtains (e.g., downloads) the counterfeit identification system 106 from the server device(s) 102. At this point, the user client device 108 is able to utilize the counterfeit identification system 106 to replace to detect digital images of counterfeit goods independently from the server device(s) 102.

In alternative embodiments, the counterfeit identification system 106 includes a web hosting application that allows the user client device 108 to interact with content and services hosted on the server device(s) 102. To illustrate, in one or more implementations, the user client device 108 accesses a web page supported by the server device(s) 102. The user client device 108 provides input to the server device(s) 102 to perform counterfeit detection, and, in response, the counterfeit identification system 106 on the server device(s) 102 performs operations. The server device(s) 102 then provides the output or results of the operations to the user client device 108.

Figure 2:
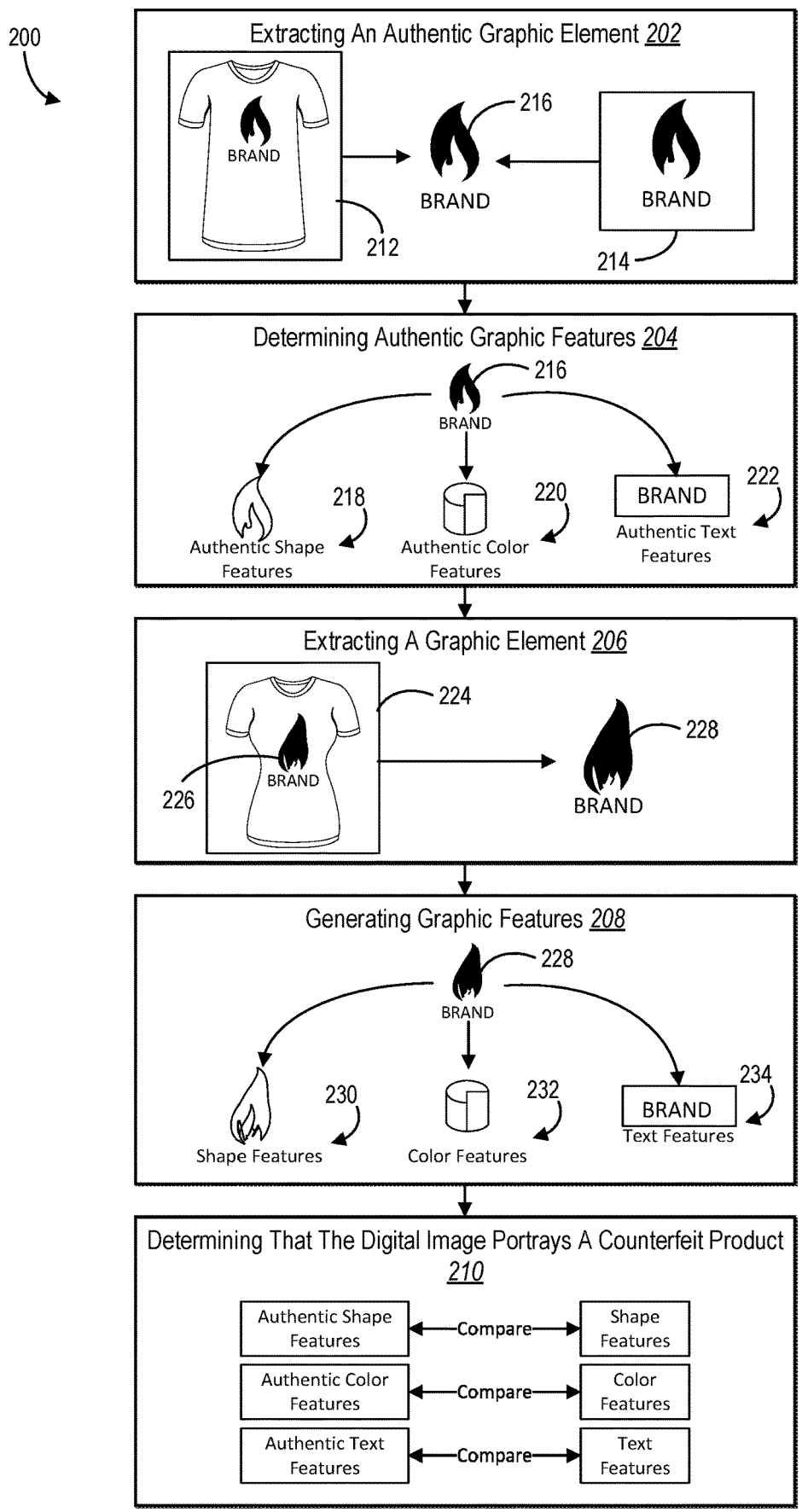
FIG. 2 illustrates an overview diagram of determining that a digital image portrays a counterfeit object in accordance with one or more embodiments of the present disclosure.

While FIG. 1 illustrates an example environment in which the counterfeit identification system 106 operates, the following figures and corresponding discussion provide additional detail regarding how the counterfeit identification system 106 determines that digital images portray counterfeit products in accordance with one or more embodiments. For example, FIG. 2 illustrates a general overview of the counterfeit identification system 106 determining that a digital image portrays a counterfeit product in accordance with one or more embodiments. In particular, FIG. 2 illustrates the counterfeit identification system 106 generating and comparing authentic graphic features from an authentic digital image with graphic features from a digital image to determine that the digital image portrays a counterfeit product. More specifically, FIG. 2 illustrates a series of acts 200 comprising an act 202 of extracting an authentic graphic element, an act 204 of determining authentic graphic features, an act 206 of extracting a graphic element, an act 208 of generating graphic features, and an act 210 of determining that the digital image portrays a counterfeit product.

As illustrated in FIG. 2, the series of acts 200 includes the act 202 of extracting an authentic graphical element. In particular, the act 202 comprises extracting an authentic graphic element 216 from an authentic digital image 212. In some embodiments, and as illustrated, the authentic digital image 212 comprises a digital image portraying an authentic product (e.g., a t-shirt). In other embodiments, the authentic digital image 212 comprises a digital image of the authentic graphic element 216. For example, in some embodiments, the authentic digital image comprises an authentic graphical element digital image 214.

The counterfeit identification system 106 receives the authentic digital image 212 and/or the authentic graphical element digital image 214 from a client device associated with an authentic vendor. For example, an authentic vendor owns the authentic graphic element 216. Additionally, or alternatively, the authentic vendor is a third party authorized by the organization to use the authentic graphic element 216. Authentic vendors typically have authentic graphical element digital images (e.g., logo files) readily available, and the counterfeit identification system 106 receives and stores the authentic graphical element digital images in a repository of authentic graphic elements. In some embodiments, the counterfeit identification system 106 extracts the authentic graphic element 216 by accessing the repository of authentic graphical elements.

Figure 3:
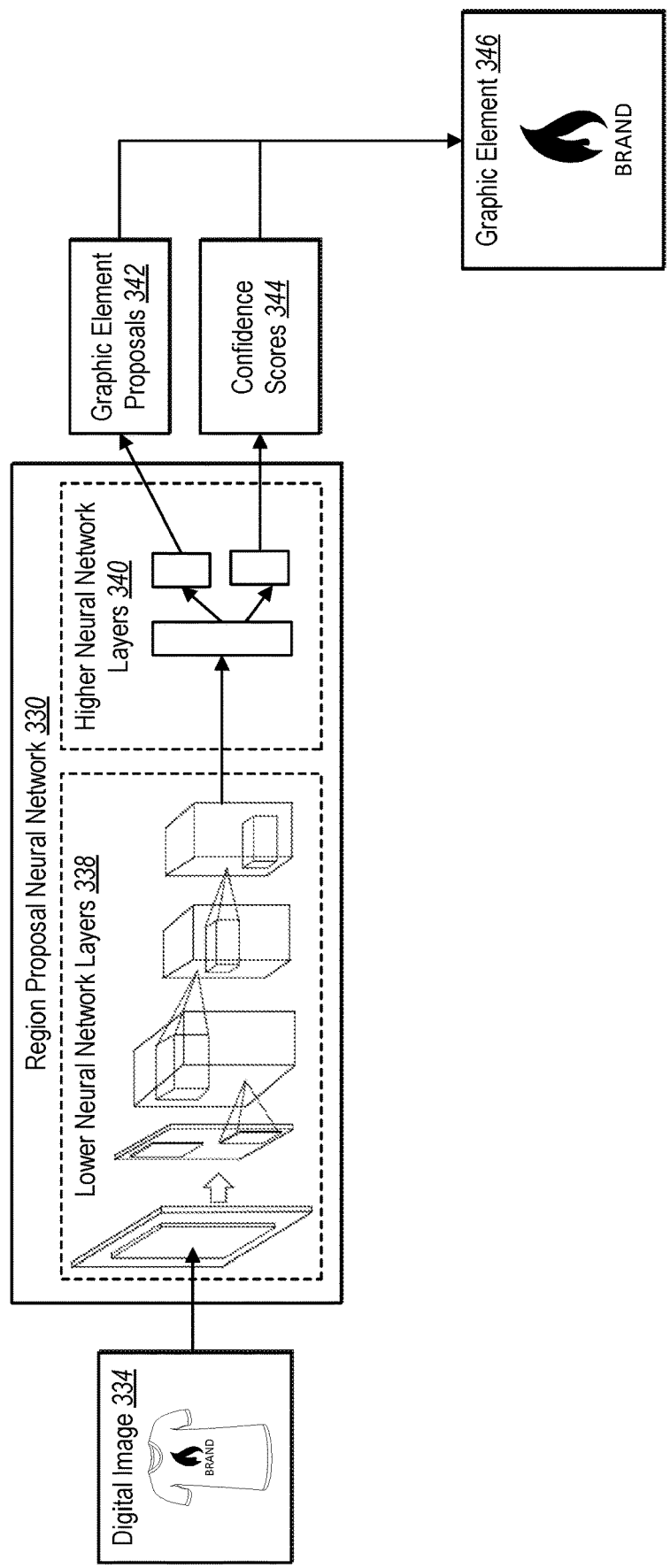
FIG. 3 illustrates an example region proposal neural network used to extract a graphic element in accordance with one or more embodiments of the present disclosure.

In instances where the counterfeit identification system 106 receives an authentic digital image 212 instead of the authentic graphical element digital image 214, the counterfeit identification system 106 extracts the authentic graphic element 216 from the authentic digital image 212. In particular, the counterfeit identification system 106 utilizes a machine learning model to generate a bounding box including a boundary of the authentic graphic element 216, a mask region, and a confidence score. FIG. 3 and the corresponding paragraphs describe how the counterfeit identification system 106 utilizes the machine learning model to extract the authentic graphic element 216 in accordance with one or more embodiments.

As further illustrated in FIG. 2, the series of acts 200 includes the act 204 of determining authentic graphic features. In particular, the act 204 comprises determining authentic graphic features for the authentic graphic element 216, wherein the authentic graphic features comprise authentic shape features 218, authentic color features 220, and authentic text features 222.

Figure 4:
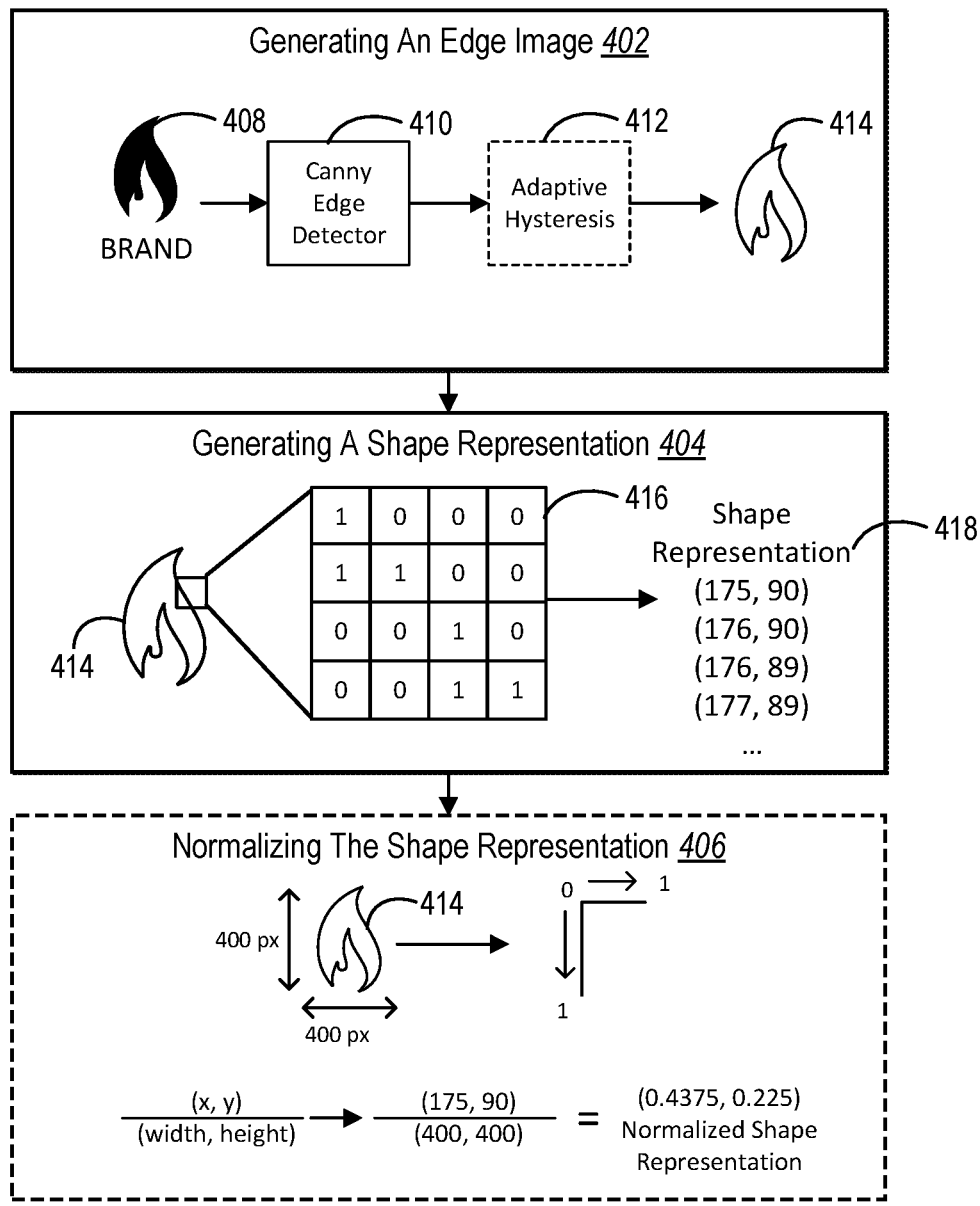
FIG. 4 illustrates an overview of generating shape features for a graphic element in accordance with one or more embodiments of the present disclosure.

Additionally, in some embodiments, the counterfeit identification system 106 performs the act 204 by generating the authentic shape features 218 based on analyzing the authentic graphic element 216. In particular, the counterfeit identification system 106 generates the authentic shape features 218 by generating an edge map of the authentic graphic element 216 utilizing a canny edge filter together with adaptive hysteresis. FIG. 4 and the corresponding discussion provide additional detail regarding how the counterfeit identification system 106 determines the authentic shape features 218 in accordance with one or more embodiments.

Figure 5:
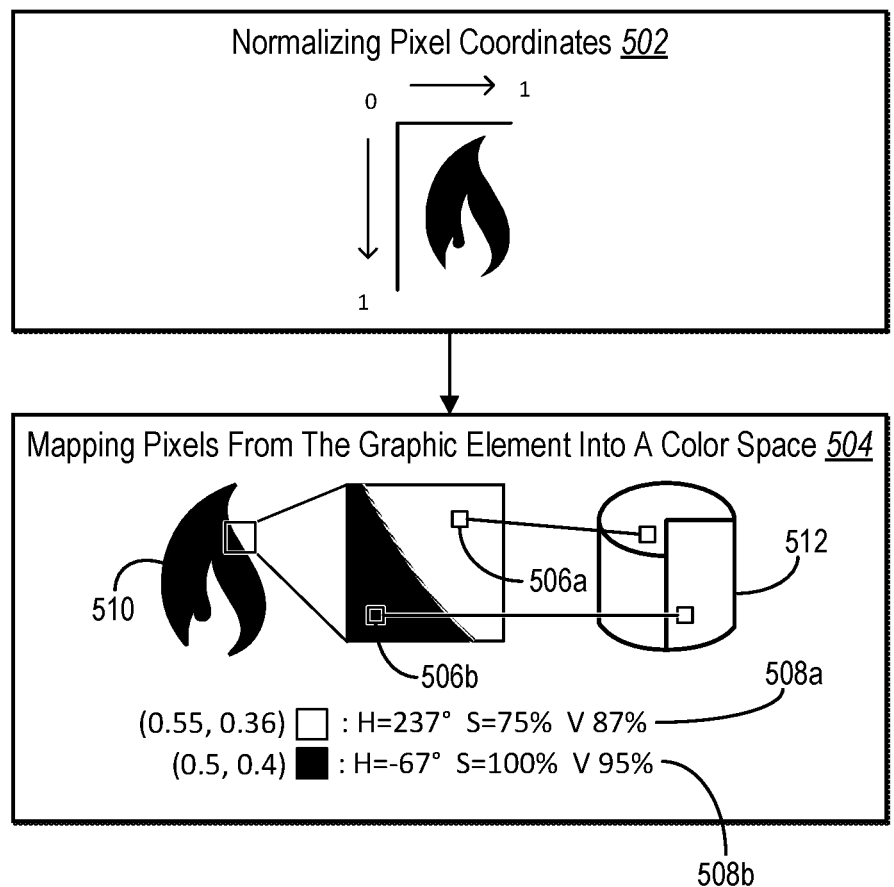
FIG. 5 illustrates an overview of generating color features for a graphic element in accordance with one or more embodiments of the present disclosure.

As further illustrated in FIG. 2, the counterfeit identification system 106 generates the authentic color features 220 based on analyzing the authentic graphic element 216. Generally, the counterfeit identification system 106 analyzes pixels within the authentic graphic element 216 to determine valid color shades and gradients of the authentic graphic element 216. For example, the counterfeit identification system 106 maps color values for each pixel within the authentic graphic element 216 in a color space, such as an HSV color space. The counterfeit identification system 106 then utilizes the resulting values as the authentic color features 220. In some embodiments, the authentic color features 220 comprise a valid range of color values for each pixel location. In particular, the counterfeit identification system 106 accounts for variation in color due to lighting conditions in which digital images are captured by determining the valid range of color values. FIG. 5 and the corresponding paragraphs provide additional detail regarding how the counterfeit identification system 106 determines the authentic color features 220 in accordance with one or more embodiments.

Figure 6:
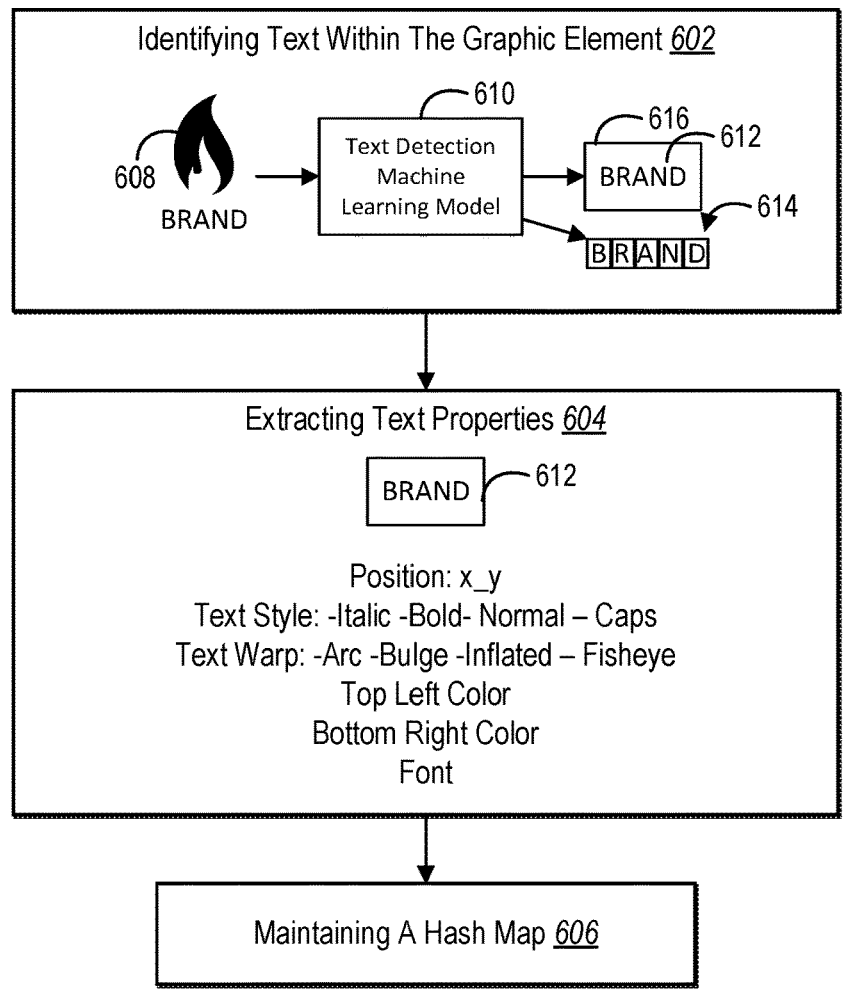
FIG. 6 illustrates an overview of generating text features for a graphic element in accordance with one or more embodiments of the present disclosure.

As part of performing the act 204 illustrated in FIG. 2, the counterfeit identification system 106 also analyzes the authentic graphic element 216 to generate the authentic text features 222. In particular, the counterfeit identification system 106 extracts text and its style used within the authentic graphic element 216. For example, the counterfeit identification system 106 analyzes properties of the text including position, style, warp, and color of the text within the authentic graphic element 216. FIG. 6 and the accompanying paragraphs provide additional detail relating to how the counterfeit identification system 106 generates the authentic text features 222 in accordance with one or more embodiments.

The series of acts 200 illustrated in FIG. 2 also includes the act 206 of extracting a graphic element. In particular, the act 206 comprises extracting a graphic element 228 from a digital image 226 portraying a product. The counterfeit identification system 106, optionally, utilizes the same machine learning model utilized as part of the act 202 of extracting an authentic graphic element to extract the graphic element 228. For example, in some embodiments, the counterfeit identification system 106 utilizes a Convolutional Neural Network (CNN)-based model that is trained using various graphic element images. FIG. 3 and the corresponding paragraphs provide additional detail relating to how the counterfeit identification system 106 extracts the graphic element 228 in accordance with one or more embodiments.

As further illustrated in FIG. 2, the series of acts 200 also includes the act 208 of generating graphic features. In particular, the counterfeit identification system 106 generates graphic features for the graphic element 228, wherein the graphic features comprise shape features 230, color features 232, and text features 234. In some embodiments, the counterfeit identification system 106 analyzes the graphic element 228 utilizing methods and processes similar to how the counterfeit identification system 106 analyzes the authentic graphic element 216. For example, the counterfeit identification system 106 generates the shape features 230 by utilizing a canny edge detector and, optionally, adaptive hysteresis. The counterfeit identification system 106 also generates the color features 232 by mapping color values for each pixel within the graphic element 228 in a color space. The counterfeit identification system 106 further generates the text features 234 by analyzing text properties of text within the graphic element 228, wherein the text properties include position, style, warp, and color. FIGS. 3-6 and the corresponding paragraphs provide additional detail regarding how the counterfeit identification system 106 generates the shape features 230, the color features 232, and the text features 234 in accordance with one or more embodiments.

The series of acts 200 illustrated in FIG. 2 further includes the act 210 of determining that the digital image portrays a counterfeit product. In particular, the counterfeit identification system 106 compares authentic shape features with the shape features, authentic color features with the color features, and authentic text features with the text features. In some embodiments, the counterfeit identification system 106 determines that the digital image portrays a counterfeit product based on determining that at least one of the shape features, color features, or text features are different than the authentic shape features, authentic color features, and authentic text features, respectively. Furthermore, in some embodiments, the counterfeit identification system 106 determines that the digital image portrays a counterfeit product based on any one of the graphic features is outside an authentic graphic feature range. For example, the counterfeit identification system 106 determines that the digital image portrays a counterfeit product based on determining that the color features are outside an authentic color feature range.

Figure 8A:
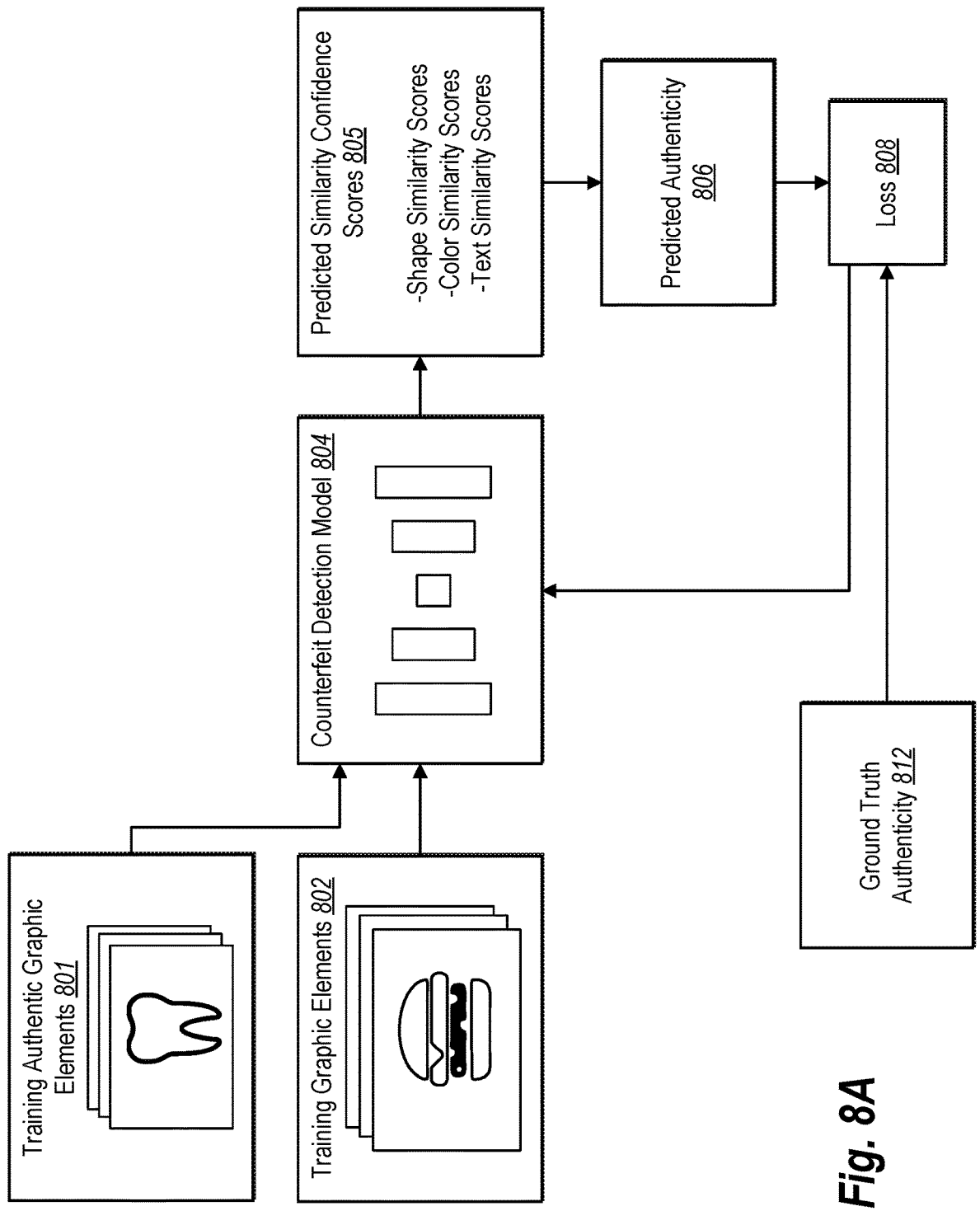
FIGS. 8A-8B illustrate learning parameters for and applying a counterfeit detection model in accordance with one or more embodiments of the present disclosure.
Figure 8B:
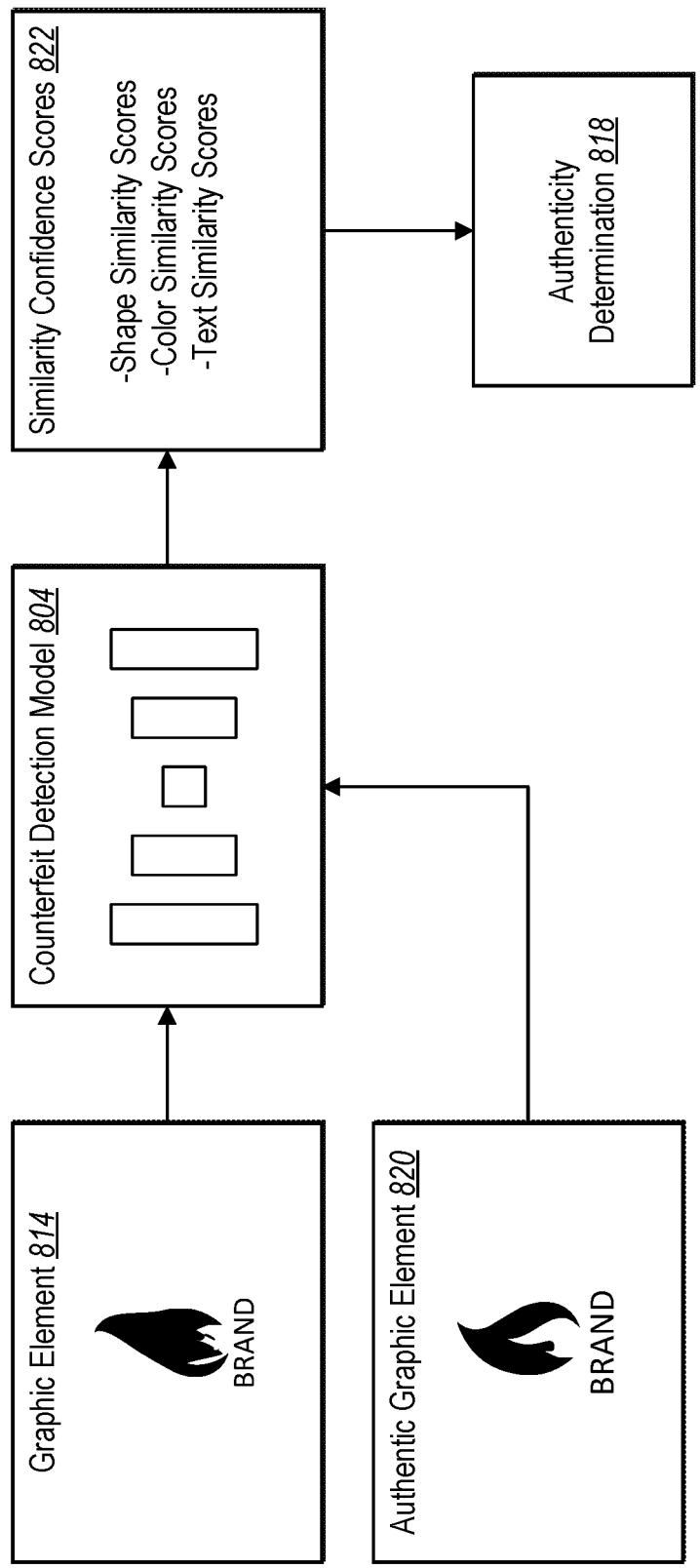

Additionally, or alternatively, the counterfeit identification system 106 performs the act 210 by utilizing a counterfeit detection model. In particular, the counterfeit identification system 106 may utilize the counterfeit detection model to analyze graphic features and authentic graphic features. Based on analyzing the graphic features and the authentic graphic features, the counterfeit identification system 106 utilizes the counterfeit detection model to generate similarity confidence score. Based on the similarity confidence score falling below a threshold similarity value, the counterfeit identification system 106 determines that the digital image portrays a counterfeit product. FIGS. 8A-8B illustrate the counterfeit identification system 106 learning parameters for and applying a counterfeit detection model in accordance with one or more embodiments.

FIG. 2 and the accompanying paragraphs describe an overview of the counterfeit identification system 106 determining that a digital image portrays a counterfeit product in accordance with one or more embodiments. The following figures and paragraphs further detail how the counterfeit identification system 106 performs the acts described with respect to FIG. 2. In particular, FIG. 3 illustrates how the counterfeit identification system 106 utilizes a region proposal neural network 330 to locate and identify a graphic element 346 in a digital image 334.

As mentioned previously, in some embodiments, the counterfeit identification system 106 utilizes a machine learning model to identify and locate the graphic element 346 within the digital image 334. The digital image 334 may represent a digital image received by the counterfeit identification system 106 from a user client device. The digital image 334 comprises a digital image portraying either an authentic or counterfeit product. For example, in some embodiments, the digital image 334 comprises a digital image portraying a counterfeit product having the counterfeit graphic element 346. In another example, the digital image 334 comprises an authentic digital image portraying an authentic product from which the counterfeit identification system 106 extracts an authentic graphic element.

FIG. 3 illustrates one implementation of a machine learning model that the counterfeit identification system 106 can utilize. In particular, FIG. 3 illustrates a region proposal neural network 330 in accordance with one or more implementations. In general, the region proposal neural network 330 can detect objects in images. In one or more embodiments, the region proposal neural network 330 is a deep learning convolutional neural network (CNN). For example, in some embodiments, the region proposal neural network 330 is a region-based CNN (R-CNN) or an object detection neural network. For instance, an example of a region proposal neural network is found in U.S. Patent Application Publication No. 2021/0027083 and entitled Automatically Detecting User-Requested Objects In Images, the entire contents of which are hereby incorporated by reference in their entirety. Another example region proposal neural network is found in S. Ren, K. He, R. Girshick, and J. Sun, Faster R-CNN. *Towards real-time object detection with region proposal networks*, NIPS, 2015, the entire contents of which is hereby incorporated by reference.

While FIG. 3 illustrates one implementation of a region proposal neural network, the counterfeit identification system 106 utilizes alternative machine learning models such as an object detection neural network or a logo detection neural network. An example, object detection neural network is described in U.S. patent application Ser. No. 17/038,866, filed on Sep. 30, 2020 and entitled Generating Composite Images With Objects From Different Times, the entire contents of which are hereby incorporated by reference in their entirety. An example, logo detection neural network, called a machine-learning-logo classifier, is described in U.S. Pat. No. 11,106,944, entitled Selecting Logo Images Using Machine-Learning-Logo Classifiers, the entire contents of which are hereby incorporated by reference in their entirety.

As shown in FIG. 3, the region proposal neural network 330 includes lower neural network layers 338 and higher neural network layers 340. In general, the lower neural network layers 338 collectively form an encoder and the higher neural network layers 340 collectively form a decoder (or potential object detector). In one or more embodiments, the lower neural network layers 338 are convolutional layers that encode the digital image 334 into feature vectors, which are outputted from the lower neural network layers 338 and inputted to the higher neural network layers 340. In various implementations, the higher neural network layers 340 comprise fully-connected layers that analyze the feature vectors and output the graphic element proposals 342 (e.g., bounding boxes around potential objects) and the proposal confidence scores 344.

In particular, the lower neural network layers 338 comprise convolutional layers that generate a feature vector in the form of a feature map. To generate the graphic element proposals 342, the region proposal neural network 330 processes the feature map utilizing a convolutional layer in the form of a small network that is slid across small windows of the feature map. The region proposal neural network 330 then maps each sliding window to a lower-dimensional feature. The region proposal neural network 330 then processes this feature using two separate heads that are fully connected layers. In particular, the first head optionally comprises a box-regression layer that generates the graphic element proposals 342 and a box-classification layer that generates the proposal confidence scores 344. As noted above, for reach region proposal, the region proposal neural network 330 generates a corresponding proposal confidence scores 344.

Furthermore, in some embodiments, the graphic element proposals 342 comprises a bounding box including the boundary of the graphic element 346 together with a mask region. Generally, mask regions indicates the borders of an object within a digital image. In particular, the region proposal neural network 330 comprises a Mask R-CNN that has an additional branch for predicting segmentation masks for each graphic element proposal in a pixel-to-pixel manner. In particular, the Mask R-CNN includes the region proposal neural network 330 to propose candidate graphic element bounding boxes and a binary mask classifier to generate masks for every class. The counterfeit identification system 106 may utilize the region proposal neural network 330 to generate multiple Regions of Interest (RoI). The counterfeit identification system 106 may then utilize a RoI Align network to warp the RoI into a fixed dimension. The counterfeit identification system 106 further feeds the warped features into fully connected layers to make classifications. The warped features are also fed into the binary mask classifier which consists of one or more CNNs to output a binary mask for each RoI.

The counterfeit identification system 106 may utilize the region proposal neural network 330 to generate a plurality of candidate graphic elements and their corresponding candidate bounding boxes, candidate mask regions, and candidate confidence scores. For example, a product depicted within the digital image 334 optionally includes several different designs, words, and symbols. In some embodiments, the counterfeit identification system 106 utilizes the confidence scores to select the graphic element 346 from the candidate bounding boxes. For example, the counterfeit identification system 106 designates a candidate graphic element corresponding with the highest candidate confidence score as the graphic element 346.

Furthermore, in some embodiments, the counterfeit identification system 106 selects the graphic element 346 based on a proposal confidence score meeting a proposal confidence score threshold. Generally, the counterfeit identification system 106 will not classify a digital image as portraying an authentic or counterfeit product if none of the proposal confidence scores 344 associated with the graphic element proposals 342 meet the proposal confidence score threshold. For example, based on determining that none of the proposal confidence scores 344 meet the proposal confidence score threshold, the counterfeit identification system 106 labels the digital image 334 as being unclassified or unknown.

FIG. 3 and the corresponding paragraphs above describe the counterfeit identification system 106 utilizing a machine learning model to extract a graphic element from a digital image in accordance with one or more embodiments. As mentioned previously, the counterfeit identification system 106 generates graphic features from extracted graphic elements. The following figures and paragraphs further detail how the counterfeit identification system 106 generates shape features, color features, and text features for both authentic graphic elements and graphic elements in accordance with one or more embodiments. In particular, FIG. 4 and the accompanying paragraphs detail how the counterfeit identification system 106 generates authentic shape features for authentic graphic elements and shape features for graphic elements in accordance with one or more embodiments. To illustrate, FIG. 4 illustrates a series of acts 400 including an act 402 of generating an edge image, an act 404 of generating a shape representation, and an optional act 406 of normalizing the shape representation.

As mentioned, the counterfeit identification system 106 generates authentic color features for an authentic graphic element and color features for a graphic element within a digital image. The counterfeit identification system 106 may perform the series of acts 400 as part of generating both the authentic color features and the color features. In some embodiments, the counterfeit identification system 106 performs the optional act 406 of normalizing the shape representation for the authentic graphic element but not for the graphic element. In yet other embodiments, the counterfeit identification system 106 performs all of the acts within the series of acts 400 for both the authentic graphic element and the graphic element.

As illustrated in FIG. 4, the series of acts 400 includes the act 402 of generating an edge image. In particular, the counterfeit identification system 106 may generate an edge image 414 for a graphic element 408 by utilizing a canny edge detector 410 and, optionally, adaptive hysteresis 412. As mentioned previously, the graphic element 408 represents an authentic graphic element or a graphic element within a digital image. Furthermore, the graphic element 408 comprises a bounding box including the boundaries of a graphic element output by the region proposal neural network described above in relation to FIG. 2.

As part of performing the act 402 of generating an edge image, the counterfeit identification system 106 may utilize the canny edge detector 410. Generally, the canny edge detector 410 comprises an edge detection algorithm that detects a wide range of edges in images. For example, the counterfeit identification system 106 utilizes the canny edge detector 410 to generate the edge image 414 indicating both boundaries and internal edges of the graphic element 408. In some embodiments, the counterfeit identification system 106 utilizes a different type of edge detection algorithm in place of the canny edge detector 410. For example, the counterfeit identification system 106 may utilize a Deriche edge detection algorithm or various other edge detection algorithms. In some embodiments, the counterfeit identification system 106 utilizes the canny edge detector 410 to generate the edge image 414.

In some embodiments the counterfeit identification system 106 additionally utilizes adaptive hysteresis 412 to compute the edge image 414. Generally, the counterfeit identification system 106 utilizes adaptive hysteresis 412 to capture minor boundary details within the graphic element 408. In particular, adaptive hysteresis 412 includes computing an adaptive threshold while performing canny edge detection. The use of adaptive hysteresis 412 enables the counterfeit identification system 106 to produce clear boundaries or edges for the edge image 414. For example, adaptive hysteresis 412 counters streaking commonly found in edge images generated using a single threshold limit. More specifically, in systems utilizing a single threshold limit, pixels meeting the threshold limit will contain an edge while pixels falling below the threshold limit will not have an edge. In contrast, in one or more embodiments, adaptive hysteresis 412 processes pixel values using an upper threshold limit and a lower threshold limit. The counterfeit identification system 106 designates pixels with vales over the upper threshold limit as edge pixels and does not designate pixels having values below the lower threshold limit as edge pixels. The counterfeit identification system 106 determines that pixels with values between the upper threshold limit and the lower threshold limit are edge pixels when surrounding pixels have already been designated as edge pixels or also exhibit high pixel values. Thus, the use of adaptive hysteresis 412 reduces streaking in the edge image 414.

The series of acts 400 illustrated in FIG. 4 includes the act 404 of generating a shape representation. In particular, the counterfeit identification system 106 generates a shape representation 418 that indicates a collection of pixel coordinates corresponding to the edge image 414. In some embodiments, the counterfeit identification system 106 determines an edge value for each pixel location for the edge image 414. For instance, and as illustrated in FIG. 4, the counterfeit identification system 106 determines a binary edge value (0 or 1) for each pixel location based on whether the pixel location has an edge. The edge values are portrayed using a matrix of edge values 416. Each square in the matrix of edge values 416 corresponds with a pixel location in the edge image 414. The counterfeit identification system 106 then generates the shape representation 418 by creating a list of pixel coordinates corresponding having a positive (e.g., 1) edge value.

As mentioned, the counterfeit identification system 106 may perform the optional act 406 of normalizing the shape representation. Generally, the counterfeit identification system 106 performs the optional act 406 to make the shape representations comparable to each other. For example, the dimensions of an authentic graphic element (e.g., 400 pixels×400 pixels) may be different than the dimensions of a graphic element (e.g., 200 pixels×200 pixels). For example, in some embodiments, the counterfeit identification system 106 converts the pixel coordinates of a single pixel into the normalized coordinates (x, y). In one or more embodiments, the counterfeit identification system 106 normalizes the pixel coordinates to a range between 0 and 1.

For example, the dimensions of the edge image 414 are 400 px by 400 px. The counterfeit identification system 106 converts the pixel coordinates within the shape representation 418 into normalized coordinates falling between 0 and 1. In some embodiments, the counterfeit identification system 106 does so by dividing the x pixel coordinate by the dimension width and the y coordinate by the dimension height. As illustrated, the normalized pixel coordinates for the shape representation equals (0.875, 0.225).

In some embodiments, the counterfeit identification system 106 performs the optional act 406 for authentic graphic elements but not for other graphic elements. For instance, in some embodiments, the counterfeit identification system 106 determines normalized authentic shape representations that the counterfeit identification system 106 uses to compare with shape representations corresponding with graphic elements within digital images. In other embodiments, the counterfeit identification system 106 normalizes shape representations for both authentic graphic elements and other graphic elements for comparison with each other.

Furthermore, the counterfeit identification system 106 may determine to perform the optional act 406 based on the type of file of the authentic graphic element. Generally, the counterfeit identification system 106 may receive the graphic element 408 in two forms: vector form and raster form. In particular, a graphic element in vector form comprises a vector file that is built by mathematical formulas that establish points on a grid. Vector file types include EPS, AI, PDF, and other file types. If the graphic element 408 is in vector form, the counterfeit identification system 106 may easily resize the graphic element 408 for comparison with other graphic elements.

In contrast, the counterfeit identification system 106 may determine to perform the optional act 406 of normalizing the shape representation based on determining that the graphic element 408 is in raster form. In particular, a graphic element in raster form comprises a raster file comprising many colored pixels or individual building blocks. Raster file types include JPEGs, GIFs, PNGs, and other image types. If the graphic element 408 is in raster form, the counterfeit identification system 106 may perform the optional act 406 of normalizing the shape representation.

FIG. 4 illustrates how the counterfeit identification system 106 generates authentic shape features and shape features in accordance with one or more embodiments. As mentioned, the counterfeit identification system 106 may also generate authentic color features and color features. FIG. 5 and the corresponding paragraphs further detail how the counterfeit identification system 106 generates authentic color features and color features in accordance with one or more embodiments. In particular, FIG. 5 illustrates a series of acts 500 comprising an act 502 of normalizing pixel coordinates and an act 504 of mapping pixels from the graphic element into a color space. As just mentioned, the counterfeit identification system 106 may perform the series of acts 500 as part of generating authentic color features associated with an authentic graphic element and also generating color features associated with a digital image.

As illustrated in FIG. 5, the series of acts 500 includes the act 502 of normalizing pixel coordinates. Generally, the counterfeit identification system 106 performs the act 502 to make the color features comparable to each other. As mentioned previously in relation to normalizing shape representations, the counterfeit identification system 106 converts the pixel coordinates of a single pixel into normalized coordinates (x, y). In one or more embodiments, the counterfeit identification system 106 normalizes the pixel coordinates to values within a range between 0 and 1. The counterfeit identification system 106 may normalize pixel coordinates based on the authentic graphic element being in raster form as opposed to an authentic graphic element being in vector form. Furthermore, in one or more embodiments, the counterfeit identification system 106 normalizes pixel coordinates for the authentic graphic element but not the graphic element. In yet other embodiments, the counterfeit identification system 106 normalizes pixel coordinates for both authentic graphic elements and graphic elements portrayed in digital images.

As further illustrated, in FIG. 5, the series of acts 500 includes the act 504 of mapping pixels from the graphic element into a color space. In particular, the counterfeit identification system 106 maps pixels from a graphic element 510 into a color space to generate color features. The graphic element 510 represents an authentic graphic element or a graphic element portrayed within a digital image. To illustrate, the counterfeit identification system 106 maps a pixel 506a at a first pixel location and a pixel 506b at a second pixel location into a color space 512. The counterfeit identification system 106 utilizes the color space 512 to generate color values for each of the pixels 506a-506b.

The counterfeit identification system 106 is able to utilize a variety of color spaces as part of generating color features and authentic color features. In one or more embodiments, the counterfeit identification system 106 maps the pixels 506a-506b into a Hue, Saturation, Value (HSV) or Hue, Saturation, Lightness (HSL) color space. The HSV and HSL color spaces are alternative representations of an RGB color model. In the HSV color space, hue is expressed as a value from 0 to 360 degrees. Saturation describes the amount of gray in a particular color and are optionally expressed as a value between 0 and 100 where 0 is associated with gray and produces a faded effect. Value, or brightness, describes the brightness or intensity of a color and are optionally expressed as a value between 0 and 100 percent where 0 is completely black and 100 is the brightest and reveals the most color. While FIG. 5 illustrates the counterfeit identification system 106 mapping the pixels 506a-506b in an HSV color space, the counterfeit identification system 106 may map the pixels 506a-506b in alternate color spaces. For example, the counterfeit identification system 106 maps the pixels 506a-506b in a Red Yellow Blue (RYB), Red Green Blue (RBG), a Cyan Magenta Yellow (CMY), or other color space.

As illustrated in FIG. 5, the counterfeit identification system 106 maps the pixels from the graphic element 510 into a color space to generate color values 508a-508b. As illustrated in FIG. 5, the color values 508a-508b correspond with the pixels 506a-506b, respectively. The counterfeit identification system 106 further associates the normalized pixel coordinates with the color values 508a-508b. In one or more embodiments, the color features and the authentic color features comprise a matrix of color values. In particular, each position in the matrix of color values corresponds with a pixel location within the graphic element 510. Each position may correspond with one or more different color values. For example, if the pixels from the graphic element were mapped into an HSV color space, each position in the matrix of color values is associated with a hue value, a saturation value, and a brightness value.

FIG. 5 and the accompanying paragraphs describe how the counterfeit identification system 106 generates color features and authentic color features in accordance with one or more embodiments. The counterfeit identification system 106 may also generate authentic text features and text features. FIG. 6 and the corresponding paragraphs illustrate how the counterfeit identification system 106 generates authentic text features and text features in accordance with one or more embodiments. In particular, FIG. 6 illustrates a series of acts 600 including an act 602 of identifying text within the graphic element, an act 604 of extracting text properties, and an act 606 of maintaining a hash map.

As illustrated in FIG. 6, the series of acts 600 includes the act 602 of identifying text within the graphic element. In particular, the counterfeit identification system 106 utilizes a text detection machine learning model 610 to extract text 612 from a graphic element 608. The graphic element 608 comprises an authentic graphic element or a graphic element from a digital image. In some embodiments, text detection machine learning model 610 comprises a CNN-based model trained using text having various properties. The counterfeit identification system 106 analyzes an image utilizing the text detection machine learning model 610 and generates a bounding box 616 including the text 612 and a corresponding text confidence score indicating a likelihood that the bounding box 616 includes text. Furthermore, in some embodiments, the text detection machine learning model 610 generates character bounding boxes 614 for individual characters within the text 612. The text detection machine learning model 610 also generates character confidence scores corresponding to the character bounding boxes 614 that indicate the likelihood that a given character bounding box contains a character.

The series of acts 600 illustrated in FIG. 6 also includes the act 604 of extracting text properties. In particular, the counterfeit identification system 106 analyzes the text 612 to extract text properties comprising at least one of position, style, warp, and color. In particular, the counterfeit identification system 106 analyzes the text 612 to extract a text position. In some embodiments, the counterfeit identification system 106 determines the position of the text 612 relative to the graphic element 608. For example, the counterfeit identification system 106 determines normalized pixel coordinates for the top left position (XY) of the text 612 within the graphic element 608. Additionally, or alternatively, the counterfeit identification system 106 may also determine the size of the text 612 relative to the graphic element 608. For example, the counterfeit identification system 106 determines normalized pixel coordinates corresponding with boundaries of the text 612.

As further illustrated in FIG. 6, the counterfeit identification system 106 also determines a text style as part of extracting text properties. Generally, text style is a resource that specifies stylistic text attributes. Example text styles include bold, italic, underline, strikethrough, overlining, capitalization, normal, or other text styles.

The counterfeit identification system 106 may also determine text warp as part of extracting text properties. Text warp refers to design or distortions that are applied to the text 612 to change the shape of the text 612. Examples of text warp properties include arc, bulge, inflation, fisheye, and other distortions.

As further illustrated in FIG. 6, as part of performing the act 604 of extracting text properties, the counterfeit identification system 106 also determines text color. In particular, the counterfeit identification system 106 determines the color of the text 612. In some embodiments, the counterfeit identification system 106 determines the color of the text 612 by mapping pixels within the text 612 in a color space (e.g., RGB, HSV, etc.). In certain embodiments, the counterfeit identification system 106 reduces the compute load required to extract text colors by selecting specific pixels within the text 612 for which to determine color values. For example, the counterfeit identification system 106 determines a color value (or range) for a pixel located in the top left of the text 612 and a second color value (or range) for a pixel located in the bottom right of the text 612. Additionally, or alternatively, the counterfeit identification system 106 measures a text color variation from one point in the text 612 to another point in the text 612. For example, the counterfeit identification system 106 determines a difference in color between a pixel located in the top left of the text 612 and a pixel located in the bottom right of the text 612.

Furthermore, as illustrated in FIG. 6, the counterfeit identification system 106 determines a font of the text 612 as part of performing the act 604 of extracting text properties. Generally, font indicates a particular size, weight, and style of a typeface. In particular, a font comprises a matched set of type with a piece for each glyph and a typeface consisting of a range of fonts that share an overall design. For example, the counterfeit identification system 106 determines that the text 612 is in Times New Roman, EB Garamond, Lora, or other font.

Additionally, in some embodiments, the counterfeit identification system 106 further extracts text kerning as part of performing the act 604. Generally, kerning refers to the spacing between characters in a text. The counterfeit identification system 106 determines the center of each character delineated by the character bounding boxes 614. The counterfeit identification system 106 then measures distances between the centers of each character. For example, the counterfeit identification system 106 measures a distance between the center of the "B" and "R," the "R" and "A," etc. The counterfeit identification system 106 further determines normalized character distances between each character in the text 612. For instance, the counterfeit identification system 106 normalizes the character distance relative to the text length.

As further illustrated in FIG. 6, the series of acts 600 also includes the act 606 of maintaining a hash map. In some embodiments, the counterfeit identification system 106 performs the act 606 only when extracting authentic text properties and not when generating text properties. Generally, the counterfeit identification system 106 maintains a hash map that stores items with the various extracted authentic text properties. In particular, the counterfeit identification system 106 maps an authentic brand and its corresponding authentic graphic element(s) to their authentic text properties within a hash map. Thus, the counterfeit identification system 106 efficiently accesses and references authentic text properties when analyzing digital images.

While FIG. 6 illustrates one way the counterfeit identification system 106 generates authentic text features, in some embodiments, the counterfeit identification system 106 receives authentic text features from a user client device associated with an authentic vendor. For example, the counterfeit identification system 106 receives, from the user client device associated with an authentic vendor, one or more acceptable positions, text styles, text warps, and text color.

Figure 7A:
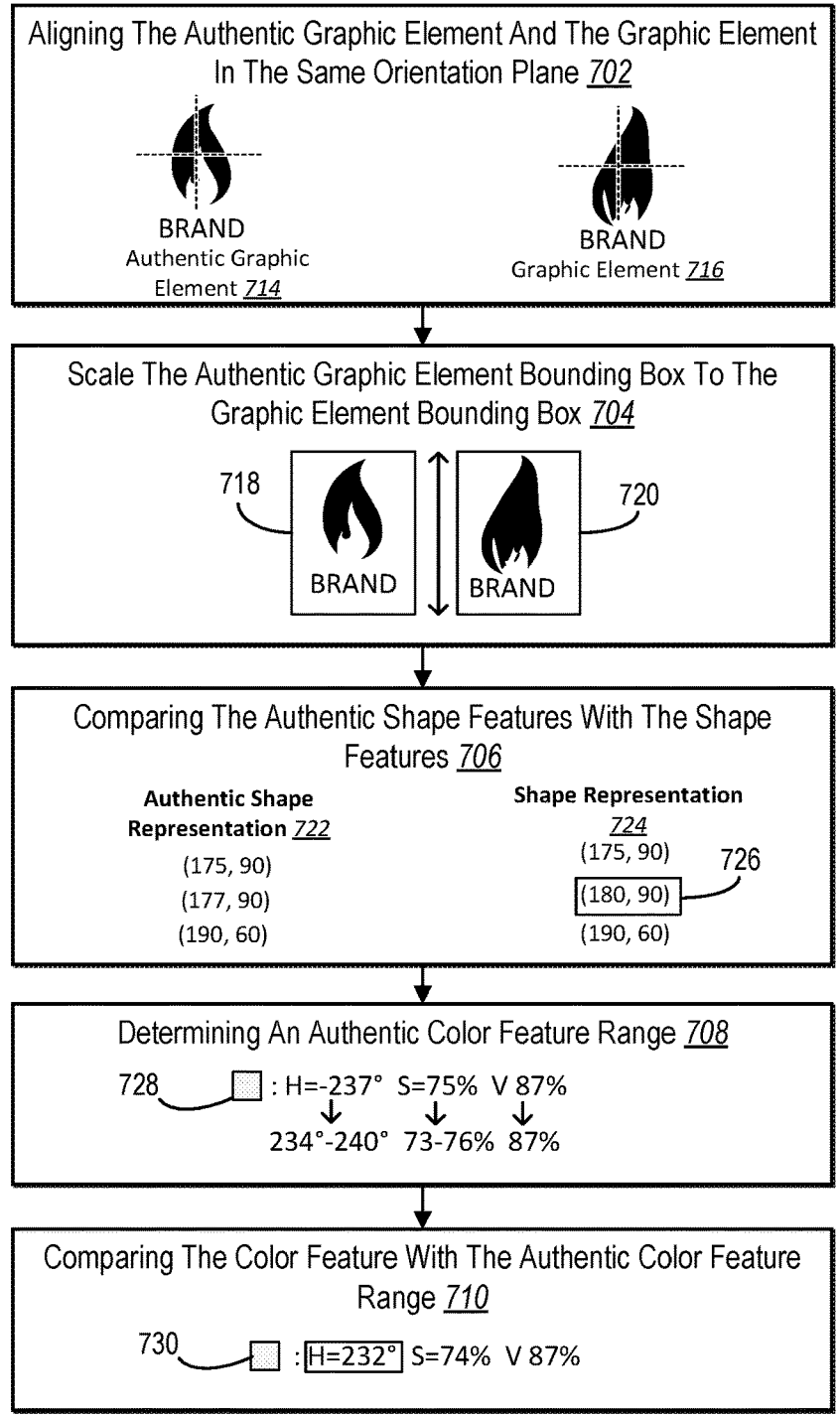

The preceding figures and paragraphs detail how the counterfeit identification system 106 extracts authentic graphic features and graphic features in accordance with one or more embodiments. As previously mentioned, the counterfeit identification system 106 compares the authentic graphic features with the graphic features to determine whether a graphic element is authentic or counterfeit. FIGS. 7A-7B and the corresponding discussion describe how the counterfeit identification system 106 compares the authentic graphic features with the graphic features to determine that a digital image portrays a counterfeit product in one or more embodiments. In particular, FIGS. 7A-7B illustrate a series of acts 700 including an act 702 of aligning the authentic graphic element and the graphic element in the same orientation plane, an act 704 of scaling the authentic graphic element bounding box to the graphic element bounding box, an act 706 of comparing the authentic shape features with the shape features, an act 708 of determining an authentic color feature range, an act 710 of comparing the color feature with the authentic color feature range, and an act 712 of comparing authentic text features with text features.

As illustrated in FIG. 7A, the series of acts 700 includes the act 702 of aligning the authentic graphic element and the graphic element in the same orientation plane. Generally, a graphic element 716 in the digital image may be askew relative to an authentic graphic element 714. Thus, the counterfeit identification system 106 adjusts the alignment of the graphic element 716 to match that of the authentic graphic element 714. In some embodiments, the counterfeit identification system 106 turns or orients the graphic element 716 to be in the same orientation plane as the authentic graphic element 714. In another example, the counterfeit identification system 106 turns both the authentic graphic element 714 and the graphic element 716 to be aligned in a common orientation plane.

The series of acts 700 further includes the act 704 of scaling the authentic graphic element bounding box to the graphic element bounding box. Generally, the counterfeit identification system 106 scales an authentic graphic element bounding box 718 to the size of a graphic element bounding box 720. This is required to normalize the bounding boxes so that comparison happens at the same scale. As mentioned, the counterfeit identification system 106 may simply scale the authentic graphic element bounding box 718 if the authentic graphic element 714 is in vector form. However, if the authentic graphic element 714 is in pixel form, the counterfeit identification system 106 scales the authentic graphic element bounding box 718 based on normalized pixel coordinates. In some embodiments, rather than scaling the authentic graphic element bounding box 718 to match the size of the graphic element bounding box 720, the counterfeit identification system 106 scales both the authentic graphic element bounding box 718 and the graphic element bounding box 720 to a common normalized scale. For example, the counterfeit identification system 106 adjusts the sizes of the authentic graphic element bounding box 718 and the graphic element bounding box 720 so pixel coordinates within both fall between the values of 0 and 1. In any case, the counterfeit identification system 106 makes the authentic graphic element bounding box 718 and the graphic element bounding box 720 the same size for comparison.

The counterfeit identification system 106 performs the acts 706-712 as part of comparing the graphic features and the authentic graphic features. In particular, and as illustrated in FIG. 7A, the counterfeit identification system 106 performs the act 706 of comparing the authentic shape features with the shape features. In particular, the act 706 comprises comparing an authentic shape representation 722 with a shape representation 724. As described previously, the authentic shape representation 722 comprises a list of pixel coordinates corresponding with edge pixels of the authentic graphic element 714, and the shape representation 724 comprises a list of pixel coordinates corresponding with edge pixels of the graphic element 716. Furthermore at least one of the authentic shape representation 722 and the shape representation 724 comprise normalized pixel coordinates for comparison on the same scale.

In some embodiments, the counterfeit identification system 106 performs the act 706 of comparing the authentic shape features with the shape features by subtracting the shape representation 724 from the authentic shape representation 722 or vice versa. By subtracting the shape representation 724 from the authentic shape representation 722, the counterfeit identification system 106 is able to find substantial differences between the shape or edges of the authentic graphic element 714 and the graphic element 716. For example, the counterfeit identification system 106 determines that the shape representation 724 differs from the authentic shape representation 722 at an edge coordinate 726. Based on determining that the shape features differ from the authentic shape features, the counterfeit identification system 106 determines that the graphic element 716 is a counterfeit graphic element. In some embodiments, the counterfeit identification system 106 determines that the shape features differ from the authentic shape features based on determining that differences between the features meet a shape difference threshold. For example, the counterfeit identification system 106 determines a sum of shape differences based on the differences between the shape representation 724 and the authentic shape representation 722. Based on the sum of shape differences meeting a shape difference threshold, the counterfeit identification system 106 determines that the graphic element 716 is a counterfeit graphic element.

As illustrated in FIG. 7A, the counterfeit identification system 106 further performs the act 708 of determining an authentic color feature range. In some embodiments, the counterfeit identification system 106 determines an authentic color feature range for each pixel coordinate within the authentic graphic element. To illustrate, the counterfeit identification system 106 determines Hue (H), Saturation (S), and Value or brightness (V) values for an authentic pixel coordinate 728 of the authentic graphic element 714. The counterfeit identification system 106 determines an authentic color feature range to account for variations in lighting, image editing, and other variables in digital images. For example, the counterfeit identification system 106 determines an authentic hue range of 234-240 degrees and an authentic saturation range of 73-76% for the authentic pixel coordinate 728. In some embodiments, the counterfeit identification system 106 determines authentic color feature ranges for some properties and not others. For example, the counterfeit identification system 106 does not determine an authentic value range but rather utilizes the authentic brightness value of 87% for comparison.

In some embodiments, the counterfeit identification system 106 performs the act 708 of determining an authentic color feature range by receiving the authentic color feature range from an authentic vendor. In particular, the counterfeit identification system 106 receives authentic color feature ranges for pixels within the authentic graphic element 714 from a user client device associated with an authentic vendor. In some embodiments, the counterfeit identification system 106 does not receive or determine pixel coordinates corresponding to the authentic color feature ranges. Instead, the counterfeit identification system 106 receives a set of authentic color feature ranges for the whole authentic graphic element 714. For example, the counterfeit identification system 106 receives a set of authentic color feature ranges acceptable for the authentic graphic element 714.

FIG. 7A further illustrates the counterfeit identification system 106 performing the act 710 of comparing the color feature with the authentic color feature range. Generally, the counterfeit identification system 106 determines whether the color feature falls within the authentic color feature range. In particular, the counterfeit identification system 106 compares color features associated with each pixel coordinate within the graphic element 716 with the authentic color features at the corresponding pixel coordinate within the authentic graphic element 714. To illustrate, the counterfeit identification system 106 determines HSV values for a pixel coordinate 730 in the digital image. The counterfeit identification system 106 compares the HSV values at the pixel coordinate 730 with the HSV value ranges at the authentic pixel coordinate 728. The counterfeit identification system 106 determines that the hue value at the pixel coordinate 730 (232 degrees) falls outside the authentic hue range (234-240 degrees) of the corresponding authentic pixel coordinate 728. In some embodiments, based on determining that the color feature falls outside the authentic color feature range, the counterfeit identification system 106 determines that the graphic element 716 is a counterfeit graphic element.

As mentioned, in some examples, the counterfeit identification system 106 determines or receives a set of authentic color feature ranges associated with the authentic graphic element 714. In such instances, the counterfeit identification system 106 compares color features of the graphic element 716 with the set of authentic color feature ranges. To illustrate, the counterfeit identification system 106 selects pixels at various pixel coordinates within the graphic element 716. The counterfeit identification system 106 compares the color features (e.g., HSV values) at the various pixel coordinates with the set of authentic color feature ranges. Based on determining that one or more of the color features falls outside the set of authentic color feature ranges, the counterfeit identification system 106 flags the graphic element 716 as a counterfeit graphic element.

As further illustrated in FIG. 7B, the series of acts 700 includes the act 712 of comparing authentic text features with text features. In particular, the counterfeit identification system 106 compares text features 734 of the graphic element 716 with authentic text features 732 of the authentic graphic element 714. In some embodiments, based on any deviation between the authentic text features 732 and the text features 734, the counterfeit identification system 106 determines that the product associated with the graphic element 716 is a counterfeit product. For example, based on determining that the text style within the text features 734 differs from the text style within the authentic text features 732, the counterfeit identification system 106 determines that the graphic element 716 is a counterfeit graphic element.

As mentioned, in some embodiments, the counterfeit identification system 106 determines that a product portrayed within a digital image is a counterfeit product based on comparing authentic graphic features with graphic features. In some embodiments, the counterfeit identification system 106 determines that a product is a counterfeit product based on any one of the shape features, color features, or text features deviating from the authentic shape features, authentic color features, or authentic text features, respectively. In other embodiments, the counterfeit identification system 106 determines that a product is a counterfeit product based on any one of the shape features, color features, or text features falling outside an authentic shape feature range, an authentic color feature range, or an authentic text feature range.

Furthermore, in some embodiments, the counterfeit identification system 106 utilizes a counterfeit detection model to determine whether a product is authentic or counterfeit. In particular, the counterfeit identification system 106 may utilize a counterfeit detection model to compare the authentic graphic features and the graphic features. FIGS. 8A-8B illustrate the counterfeit identification system 106 learning parameters for and utilizing a counterfeit detection model in accordance with one or more embodiments. FIG. 8A illustrates the counterfeit identification system 106 training a counterfeit detection model 804. Generally, the counterfeit identification system 106 inputs graphic elements 802 and training authentic graphic elements 801 into the counterfeit detection model 804 to generate predicted similarity confidence scores 805. The counterfeit identification system 106 determines a predicted authenticity 806 based on the predicted similarity confidence scores 805. The counterfeit identification system 106 compares the predicted authenticity 806 with ground truth authenticity 812 and adjusts the parameters of the counterfeit detection model 804 to reduce a loss 808 between the predicted authenticity 806 and the ground truth authenticity 812.

In relation to FIG. 8A, the counterfeit identification system 106 extracts the graphic elements 802 for the counterfeit detection model 804 from training ground truth digital images. In particular, the counterfeit identification system 106 utilizes a CNN to extract the graphic elements 802 from training ground truth digital images. The graphic elements 802 comprise a combination of authentic graphic elements and counterfeit graphic elements associated with authentic digital images and counterfeit digital images, respectively.

The counterfeit identification system 106 also inputs training authentic graphic elements 801 into the counterfeit detection model 804. The authentic graphic elements 801 comprises authentic graphic elements received from authentic vendors. In some embodiments, instead of the authentic graphic elements 801, the counterfeit identification system 106 inputs authentic shape features, authentic color features, and authentic text features for various authentic graphic elements.

The counterfeit identification system 106 utilizes the counterfeit detection model 804 to generate the predicted similarity confidence scores 805. As part of generating the predicted similarity confidence scores 805, the counterfeit detection model 804 generates training shape features, training color features, and training text features corresponding to each of the graphic elements 802. The counterfeit identification system 106 further utilizes the counterfeit detection model 804 to generate the predicted similarity confidence scores 805 corresponding to each of the training shape features, training color features, and training text features. To illustrate, the counterfeit identification system 106 utilizes the counterfeit detection model 804 to generate predicted similarity confidence scores comprising shape similarity scores, color similarity scores, and text similarity scores. The predicted similarity confidence scores 805 indicate how similar the training shape features, the training color features, and the training text features are to authentic shape features, authentic color features, and authentic text features, respectively.

As further illustrated in FIG. 8A, the counterfeit identification system 106 utilizes the predicted similarity confidence scores 805 to determine the predicted authenticity 806. In some embodiments, the counterfeit identification system 106 utilizes one or more threshold similarity values as part of generating the predicted authenticity 806. In particular, based on determining that at least one of the predicted similarity confidence scores 805 falls below a threshold similarity value, the counterfeit identification system 106 determines that the corresponding training digital image portrays a counterfeit product. To illustrate, in some embodiments, the threshold similarity value equals 0.65. Based on determining that any one of the shape similarity score, color similarity score, and text similarity score for a training graphic feature fall below the threshold similarity value, the counterfeit identification system 106 determines that the corresponding training graphic element is a counterfeit graphic element.

As mentioned, the counterfeit identification system 106 compares the ground truth authenticity 812 with the predicted authenticity 806. In particular, the counterfeit identification system 106 determines, evaluates, identifies, or generates a loss 808 between the predicted authenticity 806 and the ground truth authenticity 812. The counterfeit identification system 106 further adjusts parameters of the counterfeit detection model 804 based on the loss 808.

While FIG. 8A illustrates how the counterfeit identification system 106 learns parameters for the counterfeit detection model 804, FIG. 8B illustrates the counterfeit identification system 106 applying the counterfeit detection model 804 in accordance with one or more embodiments. During application, the counterfeit identification system 106 utilizes the counterfeit detection model 804 to analyze a graphic element 814 and authentic graphic element 820. The counterfeit identification system 106 utilizes the counterfeit detection model 804 to generate similarity confidence scores 822 and makes an authenticity determination 818 based on the similarity confidence scores 822.

The counterfeit identification system 106 extracts the graphic element 814 from a digital image portraying a product. The counterfeit identification system 106 accesses the authentic graphic element 820 from a repository of authentic graphic elements. Additionally, or alternatively, instead of inputting the authentic graphic element 820, the counterfeit identification system 106 may input authentic graphic features comprising authentic shape features, authentic color features, and authentic text features.

The counterfeit identification system 106 utilizes the counterfeit detection model 804 to generate graphic features for the graphic element 814. In particular, the counterfeit detection model 804 generates graphic features comprising shape features, color features, and text features for the graphic element 814. The counterfeit detection model 804 further compares the generated graphic features with authentic graphic features from the authentic graphic element 820. The counterfeit identification system 106 utilizes the counterfeit detection model 804 to further generate the similarity confidence scores 822 based on the comparison of the shape features, color features, and text features. More specifically, the similarity confidence scores 822 comprise a shape similarity score, a color similarity score, and a text similarity score.

As previously mentioned, the counterfeit identification system 106 makes the authenticity determination 818 based on the similarity confidence scores 822 and a threshold similarity value. In some embodiments, the threshold similarity value is fixed across all of the similarity confidence scores 822. For example, based on determining that any one of the shape similarity score, the color similarity score, or the text similarity score falling below a threshold similarity value, the counterfeit identification system 106 determines that the graphic element 814 is a counterfeit graphic element. Additionally, or alternatively, the counterfeit identification system 106 determines individual threshold similarity values for each of the graphic features. For example, the counterfeit identification system 106 determines a threshold shape similarity value of 0.65, a threshold color similarity value of 0.34, and a threshold text similarity value of 0.77.

In some embodiments, the counterfeit identification system 106 tunes or adjusts the threshold similarity value. The counterfeit identification system 106 adjusts the threshold similarity value based on the quality of the graphic element 814 or the authentic graphic element 820. For example, based on determining that the image quality of the graphic element 814 or authentic graphic element 820 is below a resolution threshold, the counterfeit identification system 106 determines to lower the threshold similarity value. In some examples, the counterfeit identification system 106 adjusts the threshold similarity values based on user input.

Figure 9:
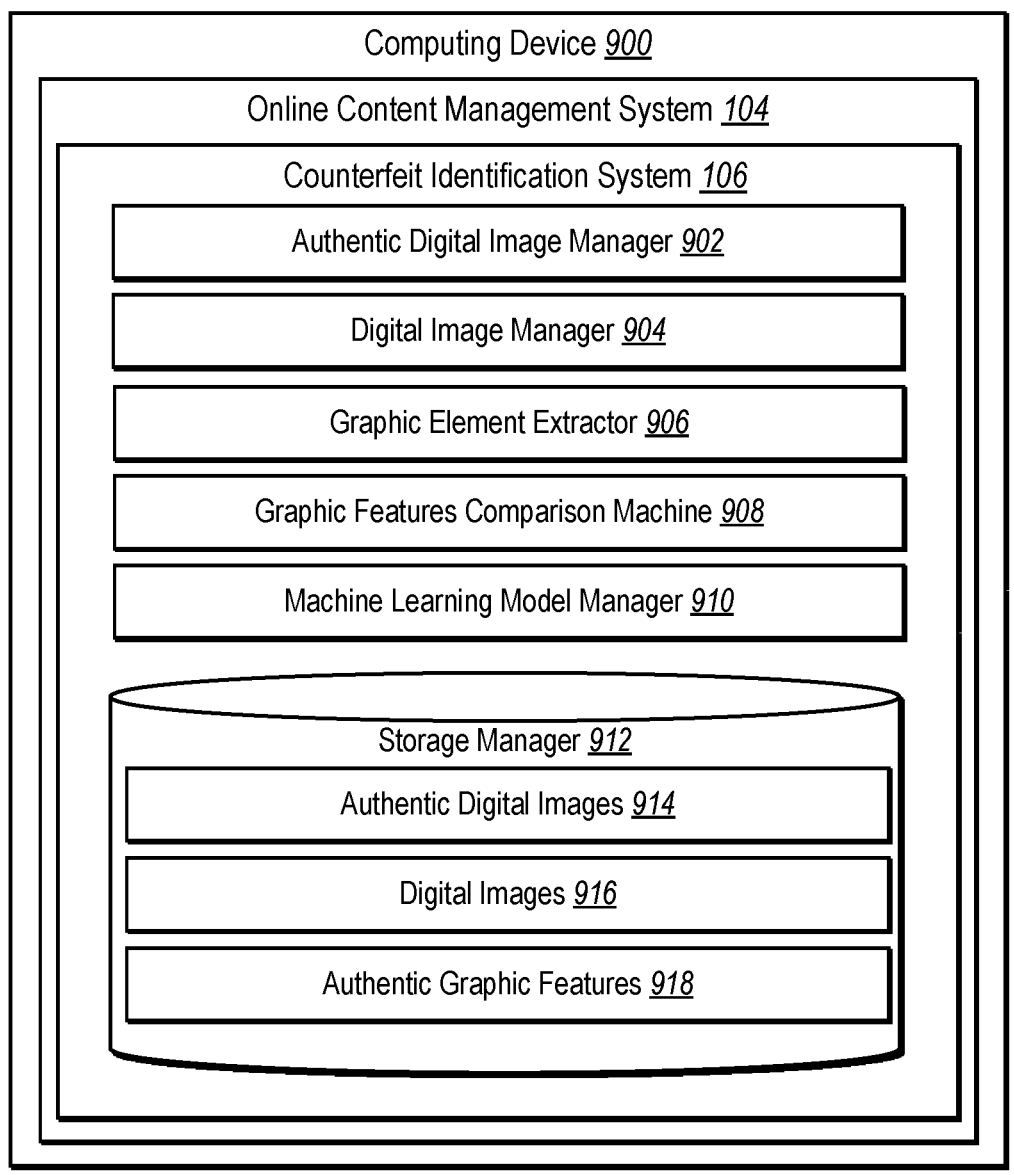
FIG. 9 illustrates a schematic diagram of an example architecture of the counterfeit identification system in accordance with one or more embodiments of the present disclosure.

FIG. 9 provides additional detail regarding various components and capabilities of the counterfeit identification system 106 in accordance with one or more embodiments. Generally, FIG. 9 illustrates the counterfeit identification system 106 implemented by the online content management system 104 on a computing device 900 (e.g., the user client device 108 and/or the server device(s) 102). As shown, the counterfeit identification system 106 includes, but is not limited to an authentic digital image manager 902, a digital image manager 904, a graphic element extractor 906, a graphic features comparison machine 908, a machine learning model manager 910, and a storage manager 912. The storage manager 912 stores authentic digital images 914, digital images 916, and authentic graphic features 918. In some embodiments, the counterfeit identification system 106 is implemented as part of the online content management system 104 in a distributed system of the server devices for identifying counterfeit products in digital images. Additionally, or alternatively, the counterfeit identification system 106 is implemented on a single computing device such as the server device(s) 102 of FIG. 1.

In one or more embodiments, each of the components of the counterfeit identification system 106 are in communication with one another using any suitable communication technologies. Additionally, the components of the counterfeit identification system 106 are in communication with one or more other devices including the user client device 108 illustrated in FIG. 1. Although the components of the counterfeit identification system 106 are shown as separate in FIG. 9, any of the subcomponents may be combined into fewer components, such as into a single component or divided into more components as may serve a particular implementation. Furthermore, although the components of FIG. 9 are described in connection with the counterfeit identification system 106, at least some components for performing operations in conjunction with the counterfeit identification system 106 described herein may be implemented on other devices within the environment.

The components of the counterfeit identification system 106 can include software, hardware, or both. For example, the components of the counterfeit identification system 106 can include one or more instructions stored on a computer-readable storage medium and executable by processors of one or more computing devices (e.g., the user client device 108). When executed by the one or more processors, the computer-executable instructions of the counterfeit identification system 106 can cause the computing devices to perform the object clustering methods described herein. Alternatively, the components of the counterfeit identification system 106 can comprise hardware, such as a special purpose processing device to perform a certain function or group of functions. Additionally, or alternatively, the components of the counterfeit identification system 106 can include a combination of computer-executable instructions and hardware.

Furthermore, the components of the counterfeit identification system 106 performing the functions described herein with respect to the counterfeit identification system 106 may, for example, be implemented as part of a stand-alone application, as a module of an application, as a plug-in for applications, as a library function or functions that may be called by other applications, and/or as a cloud-computing model. Thus, the components of the counterfeit identification system 106 may be implemented as part of a stand-alone application on a personal computing device or a mobile device. Alternatively, or additionally, the components of the counterfeit identification system 106 may be implemented in any application that provides image management, including, but not limited to ADOBE® EXPERIENCE CLOUD, such as ADOBE® MAGENTO®, ADOBE® COMMERCE CLOUD, ADOBE® ANALYTICS, ADOBE® MARKETING CLOUD™, and ADOBE® ADVERTISING CLOUD. "ADOBE", "ADOBE MAGENTO", and "ADOBE MARKETING CLOUD" are registered trademarks of Adobe Inc in the United States and/or other countries.

The counterfeit identification system 106 includes the authentic digital image manager 902. The authentic digital image manager 902 receives, accesses, and/or manages authentic digital images portraying authentic products. In some embodiments, the authentic digital image manager 902 manages authentic graphic features received by the counterfeit identification system 106.

As illustrated in FIG. 9, the counterfeit identification system 106 also includes the digital image manager 904. Generally, the digital image manager 904 receives, accesses, and/or manages digital images.

The counterfeit identification system 106 also includes the graphic element extractor 906. The graphic element extractor 906 communicates with the digital image manager 904 to access digital images. The graphic element extractor 906 also utilizes a CNN to extract graphic elements from the digital images. In some embodiments, the graphic element extractor 906 also extracts authentic graphic elements from authentic digital images.

The counterfeit identification system 106 illustrated in FIG. 9 also includes the graphic features comparison machine 908. The graphic features comparison machine 908 compares authentic graphic features with graphic features. In some embodiments, the graphic features comparison machine 908 manages the counterfeit detection model and utilizes the counterfeit detection model to compare authentic graphic elements with graphic elements.

FIG. 9 further illustrates the machine learning model manager 910 as part of the counterfeit identification system 106. The machine learning model manager 910 manages the various machine learning models utilized by the counterfeit identification system 106. In some embodiments, the machine learning model manager 910 trains and applies the machine learning models. For example, the machine learning model manager 910 manages and stores the counterfeit detection model, a region proposal neural network, and other models utilized by the counterfeit identification system 106.

The counterfeit identification system 106 also includes the storage manager 912. The storage manager 912 stores data via one or more memory devices. In particular, the storage manager 912 stores the authentic digital images authentic digital images 914, the digital images digital images 916, and the authentic graphic features 918.

Figure 10:
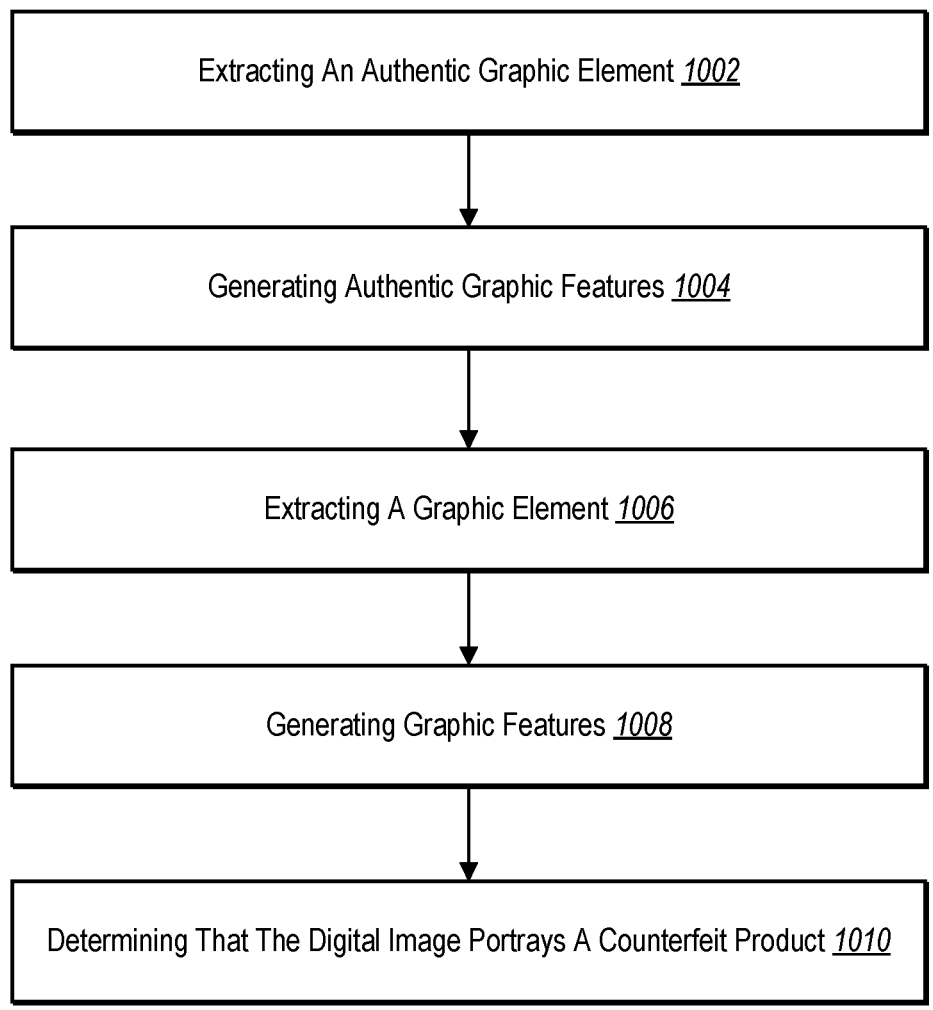
FIG. 10 illustrates a series of acts for determining that a digital image portrays a counterfeit product in accordance with one or more embodiments of the present disclosure.

FIGS. 1-9, the corresponding text, and the examples provide a number of different methods, systems, devices, and non-transitory computer-readable media of the counterfeit identification system 106. In addition to the foregoing, one or more embodiments can also be described in terms of flowcharts comprising acts for accomplishing the particular result, as shown in FIG. 10. The series of acts illustrated in FIG. 10 may be performed with more or fewer acts. Further, the illustrated acts may be performed in different orders. Additionally, the acts described herein may be repeated or performed in parallel with one another or in parallel with different instances of the same or similar acts.

FIG. 10 illustrates a flowchart of a series of acts 1000 for determining that a digital image portrays a counterfeit product in accordance with one or more embodiments. In particular, the series of acts 1000 includes an act 1002 of extracting an authentic graphic element, an act 1004 of generating authentic graphic features, an act 1006 of extracting a graphic element, an act 1008 of generating graphic features, and an act 1010 of determining that the digital image portrays a counterfeit product.

As illustrated in FIG. 10, the series of acts 1000 includes the act 1002 of extracting an authentic graphic element. In particular, the act 1002 comprises extracting an authentic graphic element from an authentic digital image. In some embodiments, the act 1002 further comprises extracting an authentic graphic element from an authentic digital image by accessing a repository of authentic graphic elements. Additionally, in some embodiments, the act 1002 comprises extracting the graphic element by utilizing a machine learning model to generate a bounding box including a graphic element boundary, a mask region, and a confidence score indicating a likelihood the bounding box includes the graphic element.

FIG. 10 further includes the act 1004 of determining authentic graphic features. In particular, the act 1004 comprises determining authentic graphic features for the authentic graphic element, wherein the authentic graphic features comprise authentic shape features, authentic color features, and authentic text features. In some embodiments, the act 1004 includes determining the authentic graphic features by receiving authentic graphic feature ranges from a user client device associated with an authentic vendor. In some embodiments, the act 1004 also includes determining the authentic graphic features by determining authentic graphic features ranges.

The series of acts 1000 illustrated in FIG. 10 also includes the act 1006 of extracting a graphic element. In particular, the act 1006 comprises extracting a graphic element from a digital image. In some embodiments, the act 1006 further comprises extracting a graphic element from a digital image by utilizing a machine learning model.

As further illustrated in FIG. 10, the series of acts 1000 includes the act 1008 of generating graphic features. In particular, the act 1008 comprises generating graphic features for the graphic element, wherein the graphic features comprise shape features, color features, and text features. Generally, the act 1008 can also include generating graphic features for the graphic element by: extracting shape features based on generating a normalized edge map of the graphic element; extracting color features based on mapping color values in a color space; and extracting text features by analyzing text properties. In some embodiments, the act 1008 further comprises extracting the graphic element by utilizing the machine learning model to generate a bounding box including a graphic element boundary, a mask region, and a confidence score indicating a likelihood the bounding box includes the graphic element.

In some embodiments, the act 1008 comprises generating the shape features for the graphic element by: generating an edge image utilizing a canny edge detector; and generating a shape representation indicating a collection of pixel coordinates corresponding to the edge image. In some embodiments, generating the edge image further comprises utilizing adaptive hysteresis. Furthermore, in one or more embodiments, the act 1008 comprises generating the color features by generating hue values and saturation values by mapping pixels from the graphic element into a color space. Additionally, in some embodiments, the act 1008 further comprises generating the text features by: identifying text within the graphic element by utilizing a text detection machine learning model; and extracting text properties comprising at least one of position, style, warp, and color.

Furthermore, in some embodiments, the act 1008 comprises generating the normalized edge map of the graphic element by: generating an edge image utilizing a canny edge detector and adaptive hysteresis; generating a shape representation indicating a collection of pixel coordinates corresponding to the edge image; and normalizing the collection of pixel coordinates. The act 1008 can further comprise extract the text features by: identifying text within the graphic element by utilizing a text detection machine learning model; and extracting the text properties comprising at least one of position, style, warp, and color.

The series of acts 1000 illustrated in FIG. 10 includes the act 1010 of determining that the digital image portrays a counterfeit product. In particular, the act 1010 comprises determining that the digital image portrays a counterfeit product based on comparing the graphic features and the authentic graphic features. In some embodiments, the act 1010 comprises determining that the digital image portrays the counterfeit product by: utilizing a counterfeit detection model to generate similarity confidence scores based on analyzing the authentic graphic features and the graphic features; and determining that at least one of the similarity confidence scores falls below a threshold similarity value. In some embodiments, the similarity confidence scores comprise shape similarity scores, color similarity scores, and text similarity scores.

In addition (or in the alternative to) the acts described above, in some embodiments, the series of acts 1000 includes a step for determining that the digital image portrays a counterfeit product based on the authentic graphic features and the graphic features. For example, the acts described in reference to FIGS. 7A-8B can comprise the corresponding acts (or structure) for performing a step for determining that the digital image portrays a counterfeit product based on the authentic graphic features and the graphic features.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
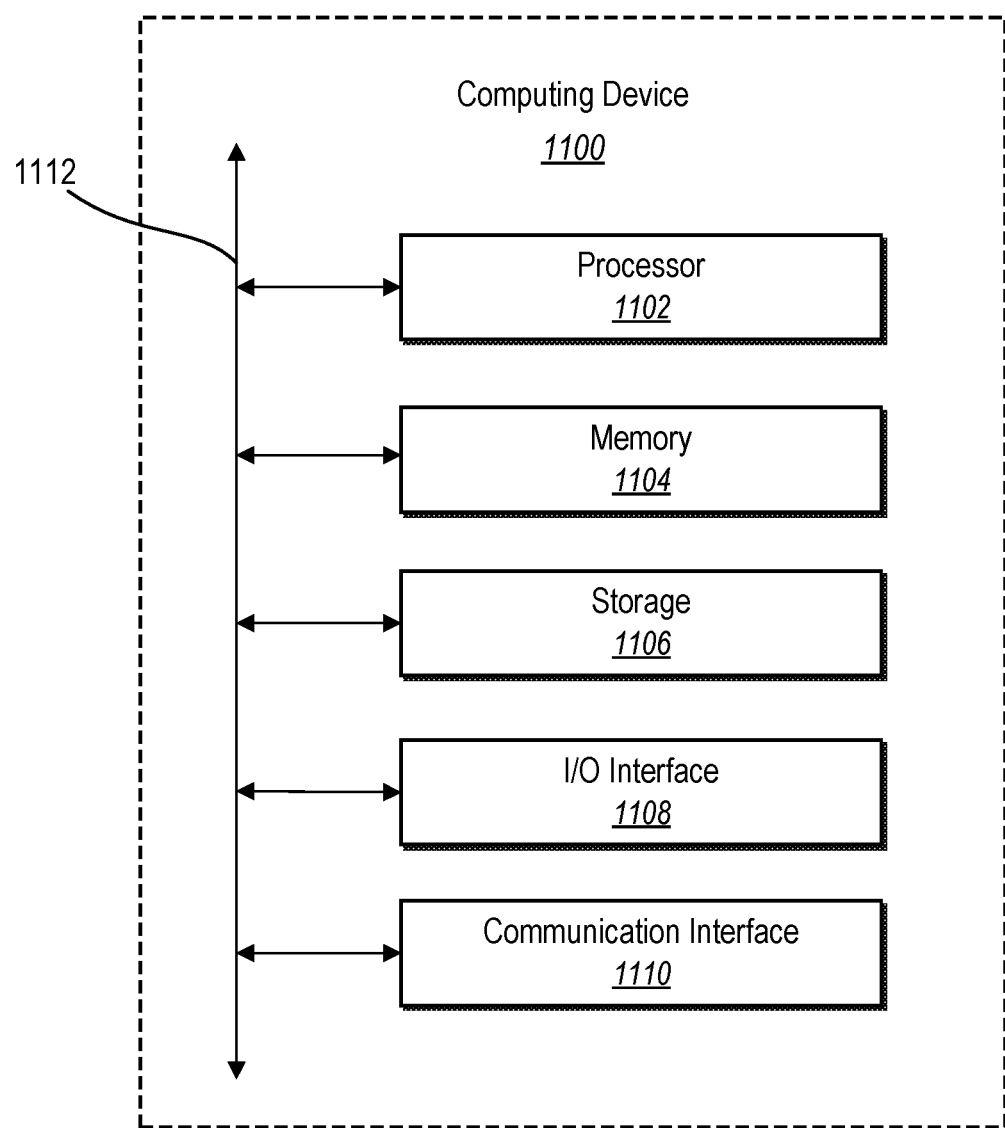
FIG. 11 illustrates a block diagram of an example computing device in accordance with one or more embodiments of the present disclosure.

FIG. 11 illustrates a block diagram of a computing device 1100 that may be configured to perform one or more of the processes described above. One will appreciate that one or more computing devices such as the computing device 1100 may implement the counterfeit identification system 106 and the online content management system 104. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium operable to identify counterfeit products by storing instructions thereon that, when executed by at least one processor, cause a computing device to:
   in response to an upload of one or more digital images of a product from a third-party vendor to an e-commerce digital environment, access an authentic graphic element from an authentic vendor that indicates acceptable positions, text styles, text warps, and text color for the authentic graphic element;
   determine authentic graphic features for the authentic graphic element by utilizing a detector to generate authentic shape features, utilizing a pixel mapping to generate authentic color features, and utilizing a text detection machine learning model to generate authentic text features;
   generate a hash map of the authentic text features by mapping the acceptable positions, the text styles, the text warps, and the text color within the hash map;
   extract a graphic element from the one or more digital images;
   generate graphic features for the graphic element by utilizing the detector to generate shape features, utilizing the pixel mapping to generate color features, and utilizing the text detection machine learning model to generate text features;
   analyze the one or more digital images to determine, utilizing a trained counterfeit detection model, that the one or more digital images uploaded from the third-party vendor portrays a counterfeit product based on a comparison comprising the authentic shape features, the authentic color features, and the hash map of the authentic text features compared with the shape features, the color features, and the text features; and
   flag the one or more digital images corresponding to the product from the third-party vendor as counterfeit prior to publicly publishing the one or more digital images of the product to the e-commerce digital environment.

2. The non-transitory computer readable medium recited in claim 1, further comprising instructions that, when executed by the at least one processor, cause the computing device to extract the graphic element from the one or more digital images by:
  utilizing a machine learning model comprising lower neural network layers and higher neural network layers to analyze feature vectors of the one or more digital images and generate graphic element proposals which indicate bounding boxes around potential objects in the one or more digital images and proposal confidence scores; and
  based on the proposal confidence scores, extract the graphic element from the graphic element proposals.

3. The non-transitory computer readable medium recited in claim 1, further comprising instructions that, when executed by the at least one processor, cause the computing device to extract the graphic element from the one or more digital images by:
  utilizing a machine learning model comprising lower neural network layers and higher neural network layers to generate a feature map of the one or more digital images and further generate graphic element proposals which indicate bounding boxes around potential objects in the one or more digital images and proposal confidence scores; and
  determining whether the proposal confidence scores meet a proposal confidence score threshold.

4. The non-transitory computer readable medium recited in claim 1, further comprising instructions that, when executed by the at least one processor, cause the computing device to:
  align the authentic graphic element and the graphic element in a common orientation plane;
  scale an authentic graphic element bounding box of the authentic graphic element to a graphic element bounding box of the graphic element, wherein the authentic graphic element is in vector form; and
  generate a first similarity confidence score by comparing a first list of pixel coordinates corresponding with edge pixels of the authentic graphic element with a second list of pixel coordinates corresponding with edge pixels of the graphic element based on scaling the authentic graphic element bounding box to the graphic element bounding box.

5. The non-transitory computer readable medium recited in claim 1, further comprising instructions that, when executed by the at least one processor, cause the computing device to generate a first similarity confidence score from comparing the authentic shape features with the shape features by:
  determining a shape difference threshold;
  determining a sum of shape differences based on differences between a shape representation and an authentic shape representation, wherein the authentic shape representation comprises a first list of pixel coordinates corresponding with edge pixels of the authentic graphic element and the shape representation comprises a second list of pixel coordinates corresponding with edge pixels of the graphic element; and
  based on the sum of shape differences meeting the shape difference threshold, generate the first similarity confidence score.

6. The non-transitory computer readable medium recited in claim 1, further comprising instructions that, when executed by the at least one processor, cause the computing device to generate a second similarity confidence score from comparing authentic color features with color features by:
  accessing, from the authentic vendor, an authentic hue range for an authentic pixel coordinate of the authentic graphic element, an authentic saturation range for the authentic pixel coordinate, and an authentic brightness value for the authentic pixel coordinate; and
  comparing the color features of the graphic element with the authentic hue range, the authentic saturation range, and the authentic brightness value to generate the second similarity confidence score.

7. The non-transitory computer readable medium recited in claim 1, further comprising:
  based on the comparison comprising the authentic shape features, the authentic color features, and the hash map of the authentic text features compared with the shape features, the color features, and the text features, generate a first similarity confidence score, a second similarity confidence score, and a third similarity confidence score;
  establish threshold similarity values comprising a threshold shape similarity value, a threshold color similarity value, and a threshold text similarity value; and
  determine that at least one of the first similarity confidence score, the second similarity confidence score, or the third similarity confidence score falls below the threshold similarity values.

8. The non-transitory computer readable medium recited in claim 7, further comprising instructions, that when executed by the at least one processor, cause the computing device to adjust the threshold shape similarity value, the threshold color similarity value, or the threshold text similarity value by:
  determining an image quality of the graphic element or the authentic graphic element is below a resolution threshold and adjusting at least one of the threshold shape similarity value, the threshold color similarity value, or the threshold text similarity value; or
  receiving user input from a client device and adjusting at least one of the threshold shape similarity value, the threshold color similarity value, or the threshold text similarity value based on the user input.

9. The non-transitory computer readable medium recited in claim 1, further comprising instructions that, when executed by the at least one processor, cause the computing device to generate the trained counterfeit detection model by:
  generating prediction similarity confidence scores from training authentic graphic elements and training graphic elements;
  generating a predicted authenticity from the prediction similarity confidence scores;
  comparing the predicted authenticity with a ground truth authenticity to generate a measure of loss; and
  adjusting parameters of a counterfeit detection model based on the measure of loss to generate the trained counterfeit detection model.

10. A system comprising:
  at least one processor; and
  a non-transitory computer readable medium storing instructions thereon that, when executed by at least one processor, cause the system to:
    in response to an upload of one or more digital images of a product from a third-party vendor to an e-commerce digital environment, by accessing an authentic graphic element from an authentic vendor that indicates acceptable positions, text styles, text warps, and text color for the authentic graphic element;

determine authentic graphic features for the authentic graphic element by utilizing a detector to generate authentic shape features, utilizing a pixel mapping to generate authentic color features, and utilizing a text detection machine learning model to generate authentic text features;

generate a hash map of the authentic text features by mapping the acceptable positions, the text styles, the text warps, and the text color within the hash map;

extract a graphic element from the one or more digital images by utilizing a machine learning model;

generate graphic features for the graphic element by:
  extracting shape features based on generating a normalized edge map of the graphic element;
  extracting color features based on mapping color values in a color space; and
  extracting text features by analyzing text properties;

compare the authentic shape features with the shape features to generate a first similarity confidence score;

compare the authentic color features with the color features to generate a second similarity confidence score;

compare the hash map with the text features to generate a third similarity confidence score;

determine, utilizing a trained counterfeit detection model, that the one or more digital images portrays a counterfeit product based on determining that at least one of the first similarity confidence score, the second similarity confidence score, or the third similarity confidence score falls below a threshold similarity value; and flag the one or more digital images corresponding to the product from the third-party vendor as counterfeit prior to publicly publishing the one or more digital images of the product to the e-commerce digital environment.

11. The system as recited in claim 10, wherein the at least one processor is further configured to cause the system to extract the graphic element by utilizing the machine learning model to generate a bounding box including a graphic element boundary, a mask region, and a confidence score indicating a likelihood the bounding box includes the graphic element.

12. The system as recited in claim 10, wherein the at least one processor is further configured to cause the system to:
  access, from the authentic vendor, an authentic hue range for an authentic pixel coordinate of the authentic graphic element, an authentic saturation range for the authentic pixel coordinate, and an authentic brightness value for the authentic pixel coordinate; and
  compare the color features of the graphic element with the authentic hue range, the authentic saturation range, and the authentic brightness value to generate the second similarity confidence score.

13. The system as recited in claim 10, wherein the at least one processor is further configured to generate the normalized edge map of the graphic element by:
  generating an edge image utilizing a canny edge detector and adaptive hysteresis;
  generating a shape representation indicating a collection of pixel coordinates corresponding to the edge image; and
  normalizing the shape representation.

14. The system as recited in claim 13, wherein the at least one processor is further configured to:
  determine a shape difference threshold;
  determine a sum of shape differences based on differences between the shape representation and an authentic shape representation; and
  based on the sum of shape differences meeting the shape difference threshold, generate the first similarity confidence score.

15. The system as recited in claim 10, wherein the at least one processor is further configured to establish a threshold shape similarity value, a threshold color similarity value, and a threshold text similarity value.

16. A method of identifying counterfeit products in digital images comprising:
  in response to an upload of one or more digital images of a product from a third-party vendor to an e-commerce digital environment, accessing an authentic graphic element from an authentic vendor that indicates acceptable positions, text styles, text warps, and text color for the authentic graphic element;
  determining authentic graphic features comprising authentic shape features, authentic color features, and authentic text features for the authentic graphic element;
  generating a hash map of the authentic text features by mapping the acceptable positions, the text styles, the text warps, and the text color within the hash map;
  extracting a graphic element from the one or more digital images;
  generating graphic features comprising shape features, color features, and text features for the graphic element;
  comparing the authentic shape features with the shape features to generate a first similarity confidence score;
  comparing the authentic color features with the color features to generate a second similarity confidence score;
  comparing the hash map with the text features for the graphic element to generate a third similarity confidence score;
  determining, utilizing a trained counterfeit detection model that the one or more digital images portrays a counterfeit product based on determining that at least one of the first similarity confidence score, the second similarity confidence score, or the third similarity confidence score falls below a threshold similarity value; and
  flagging the one or more digital images corresponding to the product from the third-party vendor as counterfeit prior to publicly publishing the one or more digital images of the product to the e-commerce digital environment.

17. The method as recited in claim 16, wherein extracting the graphic element from the one or more digital images comprises utilizing a region proposal neural network to locate and identify the graphic element in the one or more digital images by:
  generating, utilizing lower neural network layers of the region proposal neural network, feature vectors of the one or more digital images;
  generating, utilizing higher neural network layers of the region proposal neural network, graphic element proposals and proposal confidence scores from the feature vectors; and
  based on the proposal confidence scores, extracting the graphic element from the graphic element proposals.

18. The method as recited in claim 16, further comprising:
utilizing a machine learning model comprising lower neural network layers and higher neural network layers to generate a feature map of an additional one or more digital images and further generate graphic element proposals which indicate bounding boxes around potential objects in the one or more digital images and proposal confidence scores;
determining the proposal confidence scores fail to meet a proposal confidence score threshold; and
classifying the additional one or more digital images as unclassified.

19. The method as recited in claim 16, wherein generating the first similarity confidence score comprises:
determining a shape difference threshold;
determining a sum of shape differences based on differences between a shape representation and an authentic shape representation, wherein the authentic shape representation comprises a first list of pixel coordinates corresponding with edge pixels of the authentic graphic element and the shape representation comprises a second list of pixel coordinates corresponding with edge pixels of the graphic element; and
based on the sum of shape differences meeting the shape difference threshold, generating the first similarity confidence score.

20. The method as recited in claim 16, wherein generating the first similarity confidence score comprises:
subtracting a shape representation from an authentic shape representation;
based on subtracting the shape representation from the authentic shape representation, identifying differences between shapes or edges of the authentic graphic element and the graphic element that satisfy a shape difference threshold; and
based on the authentic graphic element and the graphic element satisfying the shape difference threshold, generating the first similarity confidence score.

\* \* \* \* \*